(12) United States Patent
Moon

(10) Patent No.: US 7,964,824 B2
(45) Date of Patent: Jun. 21, 2011

(54) SYSTEM, METHOD AND COMPUTER PROGRAM PRODUCT FOR PROGRAMMABLE COUNTER-TOP ELECTRIC OVEN

(75) Inventor: Jung S. Moon, Buffalo Grove, IL (US)

(73) Assignee: IBC-Hearthware, Inc., Libertyville, IL (US)

( * ) Notice: Subject to any disclaimer, the term of this patent is extended or adjusted under 35 U.S.C. 154(b) by 213 days.

(21) Appl. No.: 11/987,487

(22) Filed: Nov. 30, 2007

(65) Prior Publication Data
US 2009/0139981 A1    Jun. 4, 2009

(51) Int. Cl.
*H05B 1/02*    (2006.01)

(52) U.S. Cl. ............... 219/490; 219/506; 219/446.1; 219/448.11; 219/413

(58) Field of Classification Search ............ 3/490, 494, 3/497, 505, 506, 446.1, 448.1, 412–415
See application file for complete search history.

(56) References Cited

U.S. PATENT DOCUMENTS

| | | |
|---|---|---|
| 2,274,325 A | 2/1942 | Ford |
| D133,344 S | 8/1942 | Austin |
| 2,654,824 A | 10/1953 | Schroeder |
| 2,848,592 A | 8/1958 | Mergen |
| 2,864,932 A | 12/1958 | Forrer |
| 2,893,307 A | 7/1959 | Rodriguez |
| 3,281,575 A | 10/1966 | Ferguson, Jr. |
| D212,820 S | 11/1968 | Benes |
| 3,851,639 A | 12/1974 | Beddoe |
| 3,882,767 A | 5/1975 | Oyler et al. |
| 4,188,520 A | 2/1980 | Dills |
| 4,210,072 A | 7/1980 | Pedrini |
| 4,350,874 A | 9/1982 | Nishikawa |
| 4,476,848 A | 10/1984 | Dornbush |
| 4,625,097 A | 11/1986 | Miwa |
| 4,629,850 A | 12/1986 | Tanabe |
| 4,629,865 A | 12/1986 | Freedman et al. |
| 4,663,517 A | 5/1987 | Huff et al. |
| D293,539 S | 1/1988 | Nishikawa |
| 4,756,091 A | 7/1988 | Van Denend |
| 4,817,509 A | 4/1989 | Erickson |

(Continued)

FOREIGN PATENT DOCUMENTS

KR    1996-0002662    3/1996

OTHER PUBLICATIONS

Notification of the International Search Report and Written Opinion of the International Searching Authority, International Search Report and Written Opinon, Mailing date of Feb. 5, 2009, issued in International Application No. PCT/US08/13235.

(Continued)

*Primary Examiner* — Mark H Paschall
(74) *Attorney, Agent, or Firm* — Albrecht Tousi & Farnum PLLC; Ralph P. Albrecht

(57) ABSTRACT

A multi-stage cooking method for a counter-top electric oven is provided. The oven may include at least one cooking element and at least one control system coupled to the cooking element, the control system including a processor, a storage device, and an input interface. The multi-stage cooking method may include: receiving the multi-stage cooking recipe for the counter-top electric oven; storing the multi-stage cooking recipe in the storage device of the counter-top electric oven; and executing the multi-stage cooking recipe with the counter-top electric oven.

28 Claims, 20 Drawing Sheets

U.S. PATENT DOCUMENTS

| | | | |
|---|---|---|---|
| D302,095 S | 7/1989 | Nishikawa | |
| D302,642 S | 8/1989 | Nishikawa | |
| 4,870,255 A | 9/1989 | Fujii | |
| 4,913,047 A | 4/1990 | Burley | |
| D313,679 S | 1/1991 | Sakamoto | |
| 5,045,671 A | 9/1991 | Kanaya et al. | |
| 5,097,112 A | 3/1992 | Kanaya et al. | |
| 5,107,097 A | 4/1992 | Negandhi et al. | |
| D328,834 S | 8/1992 | Chang | |
| 5,157,239 A | 10/1992 | Kanaya et al. | |
| 5,165,328 A | 11/1992 | Erickson et al. | |
| 5,217,545 A | 6/1993 | Smith et al. | |
| D344,873 S | 3/1994 | Chang | |
| 5,329,919 A | 7/1994 | Chang | |
| 5,338,616 A | 8/1994 | Ishii et al. | |
| D350,449 S | 9/1994 | Kaneko | |
| D355,564 S | 2/1995 | Dornbush et al. | |
| 5,403,607 A | 4/1995 | Erickson | |
| 5,404,420 A | 4/1995 | Song | |
| 5,416,950 A | 5/1995 | Dornbush | |
| D358,963 S | 6/1995 | Kaneko | |
| 5,423,249 A | 6/1995 | Meyer | |
| 5,437,108 A | 8/1995 | Alseth | |
| 5,438,916 A | 8/1995 | Dornbush | |
| D364,308 S | 11/1995 | Chang | |
| 5,465,651 A | 11/1995 | Erickson et al. | |
| 5,466,912 A | 11/1995 | Dornbush et al. | |
| 5,484,621 A | 1/1996 | Erickson | |
| 5,485,780 A | 1/1996 | Koether et al. | |
| D367,396 S | 2/1996 | Hsu | |
| D369,274 S | 4/1996 | Dornbush et al. | |
| D369,514 S | 5/1996 | Baldwin | |
| 5,513,558 A | 5/1996 | Erickson et al. | |
| 5,520,096 A | 5/1996 | Dornbush et al. | |
| 5,534,681 A | 7/1996 | Hwang | |
| 5,548,102 A | 8/1996 | Kwon | |
| 5,598,769 A | 2/1997 | Luebke et al. | |
| 5,676,044 A | 10/1997 | Lara | |
| 5,699,722 A | 12/1997 | Erickson et al. | |
| 5,735,190 A | 4/1998 | Sham | |
| 5,747,781 A | 5/1998 | Kim et al. | |
| 5,793,023 A | 8/1998 | Hong et al. | |
| 5,801,357 A | 9/1998 | Danen | |
| 5,801,362 A | 9/1998 | Pearlman et al. | |
| 5,845,563 A | 12/1998 | Haring et al. | |
| 5,877,477 A | 3/1999 | Petty et al. | |
| 5,878,508 A | 3/1999 | Knoll et al. | |
| 5,880,436 A | 3/1999 | Keogh | |
| 5,974,957 A | 11/1999 | Ysen | |
| 6,018,146 A | 1/2000 | Uzgiris et al. | |
| D424,862 S | 5/2000 | Holbrook | |
| 6,069,345 A | 5/2000 | Westerberg | |
| 6,085,442 A | 7/2000 | Erickson | |
| 6,093,918 A | 7/2000 | Sohn | |
| 6,093,919 A | 7/2000 | Seo et al. | |
| 6,127,666 A | 10/2000 | Sohn | |
| 6,172,347 B1 | 1/2001 | Lee | |
| 6,198,076 B1 | 3/2001 | Moen | |
| 6,201,217 B1 | 3/2001 | Moon et al. | |
| 6,255,630 B1 | 7/2001 | Barnes et al. | |
| 6,316,757 B1 | 11/2001 | Kim et al. | |
| 6,363,836 B1 | 4/2002 | Usherovich | |
| 6,448,540 B1 | 9/2002 | Braunisch et al. | |
| 6,502,265 B2 | 1/2003 | Blair et al. | |
| D469,657 S | 2/2003 | Becker et al. | |
| 6,521,870 B2 | 2/2003 | Nolan et al. | |
| 6,617,554 B2 | 9/2003 | Moon et al. | |
| D487,670 S | 3/2004 | Moon et al. | |
| 6,730,880 B2 | 5/2004 | Smith | |
| D490,648 S | 6/2004 | Moon et al. | |
| 6,747,250 B1 | 6/2004 | Cha | |
| 6,809,301 B1 | 10/2004 | McIntyre et al. | |
| 6,917,016 B2 | 7/2005 | Baecker et al. | |
| 6,917,017 B2 | 7/2005 | Moon et al. | |
| 6,936,795 B1 | 8/2005 | Moon et al. | |
| 6,940,049 B2 | 9/2005 | Harwell et al. | |
| 6,967,314 B2 | 11/2005 | Sauter et al. | |
| 7,012,220 B2 | 3/2006 | Boyer et al. | |
| 7,021,203 B2 | 4/2006 | Backus | |
| 7,159,510 B2 | 1/2007 | Lamaster et al. | |
| 7,225,729 B2 | 6/2007 | Backus | |
| 7,323,663 B2 | 1/2008 | Cavada et al. | |
| 7,348,521 B2 | 3/2008 | Lee et al. | |
| 7,360,533 B2 | 4/2008 | McFadden | |
| 7,479,006 B2 * | 1/2009 | Newsom | 431/12 |
| 7,487,716 B2 | 2/2009 | Swank et al. | |
| 7,619,186 B2 | 11/2009 | Cavada et al. | |
| 2002/0023545 A1 | 2/2002 | Backus | |
| 2002/0144607 A1 | 10/2002 | Backus | |
| 2003/0062360 A1 | 4/2003 | Moon | |
| 2005/0172835 A1 | 8/2005 | Lamaster et al. | |
| 2006/0144250 A1 | 7/2006 | Backus | |
| 2006/0225580 A1 | 10/2006 | Fernandez et al. | |
| 2008/0190911 A1 | 8/2008 | Adamski | |
| 2009/0025248 A1 | 1/2009 | Lannon | |

OTHER PUBLICATIONS

Notification of the International Search Report and the Written Opinion of the International Searching Authority, International Search Report and Written Opinon, Mailing date Feb. 5, 2009.
Hearthware's LPR 2.2 Initial Infringement Contentions—Oct. 28, 2009.
Morningware's LPR 2.3 Initial Invalidity, Noninfr. And Unenf. Contentions—Nov. 9, 2009.
Hearthware's initial Response to Invalidity Contentions Pursuant to LPR 2.5—Jan. 22, 2010.
DI 107, 107a, 107b, and 107c—Hearthware's First Amended Counterclaims including exhibits A, B and C—Feb. 11, 2010.
DI 125 and DI 125a—Morningware's Supplemental Answer to Hearthware's First Amended Counterclaims and Exhibit—Apr. 29, 2010.
Morningware's LPR 3.1 Final Invalidity And Unenf. Contentions—Jul. 6, 2010.
Hearthware's LPR 3.1 Amended and Final Infringement Contentions—Jul. 6, 2010.
Memorandum in Support of Morningware's Motion to Strike Hearthware Home Products LPR 3.1 Final Infringement Contentions And Dismiss Hearthware's Infringement Claim—Jul. 21, 2010.
Morningware's LPR 3.2 Final Non-Infringement Contentions—Aug. 3, 2010.
Hearthware's Opposition to Morningware's Motion to Strike Hearthware's LPR 3.1 Final Infringement Contentions—Aug. 16, 2010.
Morningware's Reply to Hearthware's Opposition to Morningware's Motion to Strike Hearthware's LPR 3.1 Final Infringement Contentions—Aug. 30, 2010.
Hearthware's Response to Morningware's Invalidity Contentions Pursuant to LPR 3.2—Aug. 3, 2010.
Morningware's Opening Claim Construction Brief and Exhibits A, B, C & D—Under LRP 4.2—Sep. 22, 2010.
Hearthware's Claim Construction Brief Under LPR 4.2 and Appendix E—Oct. 20, 2010.
DI 144—Plaintiff's Counterdefendant Morningware, Inc.'s Reply Claim Construction Brief on U.S. Patent No. 6,201,217 Pursuant to LPR 4.2(D)—Nov. 3, 2010.
DI 134-1—Joint Claim Construction Chart—Sep. 8, 2010.
Final Joint Claim Construction Char—Nov. 10, 2010.
DI 163—Markman Memorandum Opinion and Order, Hon. J. St. Eve—Feb. 23, 2011.
Hearthware's Memorandum of Law in Support of Its Motion for Reconsideration, Mar. 9, 2011.
DI 172—Morningware's Opposition to Hearthware's Motion for Reconsideration, Mar. 17, 2011.
DI 185—Court grants IBC-Hearthware, Inc.'s motion for partial reconsideration, Hon. A. J. St. Eve—Apr. 12, 2011.

* cited by examiner

180

170

SYSTEM, METHOD AND COMPUTER PROGRAM PRODUCT FOR PROGRAMMABLE COUNTER-TOP ELECTRIC OVEN

BACKGROUND

1. Field

The present invention relates generally to electric ovens, and more particularly to a counter-top electric oven.

2. Related Art

Counter-top ovens are known and offer many advantages over conventional ovens. An exemplary counter-top oven is described in U.S. Pat. No. 6,201,217 to Moon, et al., of common assignee to the present invention, the contents of which are incorporated herein by reference in their entirety. In comparison to conventional ovens, counter-top electric ovens typically offer the advantage of being less bulky and having quicker cooking times. Some conventional counter-top ovens may typically include numerical displays allowing the user to choose a mode as well as a desired cooking time. However, such counter-top ovens often require the user to continuously monitor the heating element to manually maintain a desired temperature and to manually switch between various cooking modes. What is needed is a counter-top oven that overcomes shortcomings of conventional ovens.

SUMMARY OF THE INVENTION

In an exemplary embodiment of the present invention, a system, method and computer program product for a multi-stage programmable counter-top electric oven is disclosed.

According to an exemplary embodiment of the invention, there may be provided a multi-stage cooking method for a counter-top electric oven, the oven may include at least one cooking element and at least one control system coupled to the cooking element, the control system may include a processor, a storage device, and an input interface, where the method may include receiving the multi-stage cooking recipe from the input interface for the counter-top electric oven; storing the multi-stage cooking recipe in the storage device of the counter-top electric oven; and executing by the processor the multi-stage cooking recipe with the counter-top electric oven.

According to a further exemplary embodiment, the receiving the multi-stage cooking recipe may include receiving at least one of a cooking mode, a power level, or a duration of mode. In an exemplary embodiment, the cooking mode may include a delay stage, a sear stage, a cooking stage and/or a warming stage. In an exemplary embodiment, the receiving the multi-stage cooking recipe may include receiving a stage and the duration of the stage.

In an exemplary embodiment, the control system may further include a temperature probe and the receiving the multi-stage cooking recipe may further include receiving a duration of mode based on a temperature and/or doneness as measured by the probe.

In an exemplary embodiment, the receiving the multi-stage cooking recipe may include recalling a previously programmed user-entered multi-stage cooking recipe from the storage device. In a further exemplary embodiment, the recalling step may include editing the previously programmed user-entered multi-stage cooking recipe.

In an exemplary embodiment of the invention, the receiving the multi-stage cooking recipe may include receiving user entered stages from a numeric keypad input interface. In a further exemplary embodiment, the numeric keypad input interface may include a plurality of cooking control elements and the receiving user entered stages may include receiving the multi-stage cooking recipe from the plurality of cooking control elements.

According to an exemplary embodiment, the control system may further include a display and the receiving the multi-stage cooking recipe may further include displaying data regarding the multi-stage cooking recipe on the display. In an exemplary embodiment, the storing the multi-stage cooking recipe may include storing the multi-stage cooking recipe in a volatile storage device.

In an exemplary embodiment of the invention, the storing the multi-stage cooking recipe may include saving a user entered multi-stage cooking recipe in a non-volatile storage device. In a further exemplary embodiment, the storing the multi-stage cooking recipe may further include overwriting a previously programmed user-entered multi-stage cooking recipe stored in the non-volatile storage device.

According to an exemplary embodiment, at least one of the receiving the multi-stage cooking recipe and/or storing the multi-stage cooking recipe may occur during the executing the multi-stage cooking recipe. In an exemplary embodiment, the executing the multi-stage cooking recipe may include sequentially executing the stored multi-stage cooking recipe.

In an exemplary embodiment, the executing the multi-stage cooking recipe may include cooking with at least one heating element. In a further exemplary embodiment, the cooking element may include an infrared heating element and the executing the multi-stage cooking recipe may further include cooking with the infrared heating element. In a further exemplary embodiment, the infrared heating element comprises a ceramic coating.

In an exemplary embodiment, the executing the multi-stage cooking recipe may include cooking with a plurality of heating elements. In an exemplary embodiment, the cooking with the plurality of heating elements may include cooking at an individually selectable power level for each heating element.

In an exemplary embodiment of the invention, the control system may include a temperature probe and the executing the multi-stage cooking recipe may further include altering execution based on data from the temperature probe. In an exemplary embodiment, the control system may include a display and the executing a multi-stage cooking recipe may further include displaying information regarding progress of the executing of the multi-stage cooking recipe on the display.

According to an exemplary embodiment, there may be provided, according to an exemplary embodiment, a multi-stage cooking counter-top electric oven including at least one cooking element, and at least one control system coupled to the one or more cooking element, the control system may include: a processor operable to execute a multi-stage cooking recipe with the counter-top electric oven; an input interface operable to receive the multi-stage cooking recipe for the counter-top electric oven; and a storage device operable to store the multi-stage cooking recipe in the counter-top electric oven.

According to a further exemplary embodiment, the heating element may be arranged to avoid any drippings from the object being cooked. In an exemplary embodiment, the plurality of heating elements may include at least one of a top and/or a bottom heating element.

In an exemplary embodiment, the oven may further include a cooking enclosure comprising polycarbonate. In another exemplary embodiment, the cooking enclosure may include at least one of polycarbonate, glass and/or metal. In an exemplary embodiment, the oven may further include a cooking enclosure having a least one of a door and/or a cover which is slidable, removable, and/or hinged. In an exemplary embodiment, the oven may be further adapted to receive a rotisserie. In an exemplary embodiment, the oven may further include a pan, a cooking rack and a fan.

According to an exemplary embodiment, there may be provided, according to an exemplary embodiment, a control system for a counter-top electric oven, which may include a processor operable to execute a multi-stage cooking recipe with a counter-top electric oven; an input interface operable to receive the multi-stage cooking recipe for the counter-top electric oven; and a storage device operable to store the multi-stage cooking recipe in the counter-top electric oven.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of various exemplary embodiments, including a preferred embodiment of the invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

A preferred and various other exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

An exemplary counter-top electric oven is described herein with reference to the accompanying drawings in accordance to an exemplary embodiment of the invention. However, it should be understood that many features of the invention may find utility in other types of counter-top electric cooking ovens, including those using cyclonic air flow in combination with simple resistance electric heating elements. Accordingly, no limitation is intended to use in connection with an infrared heating element except insofar as expressly stated in the appended claims.

Figure 1:
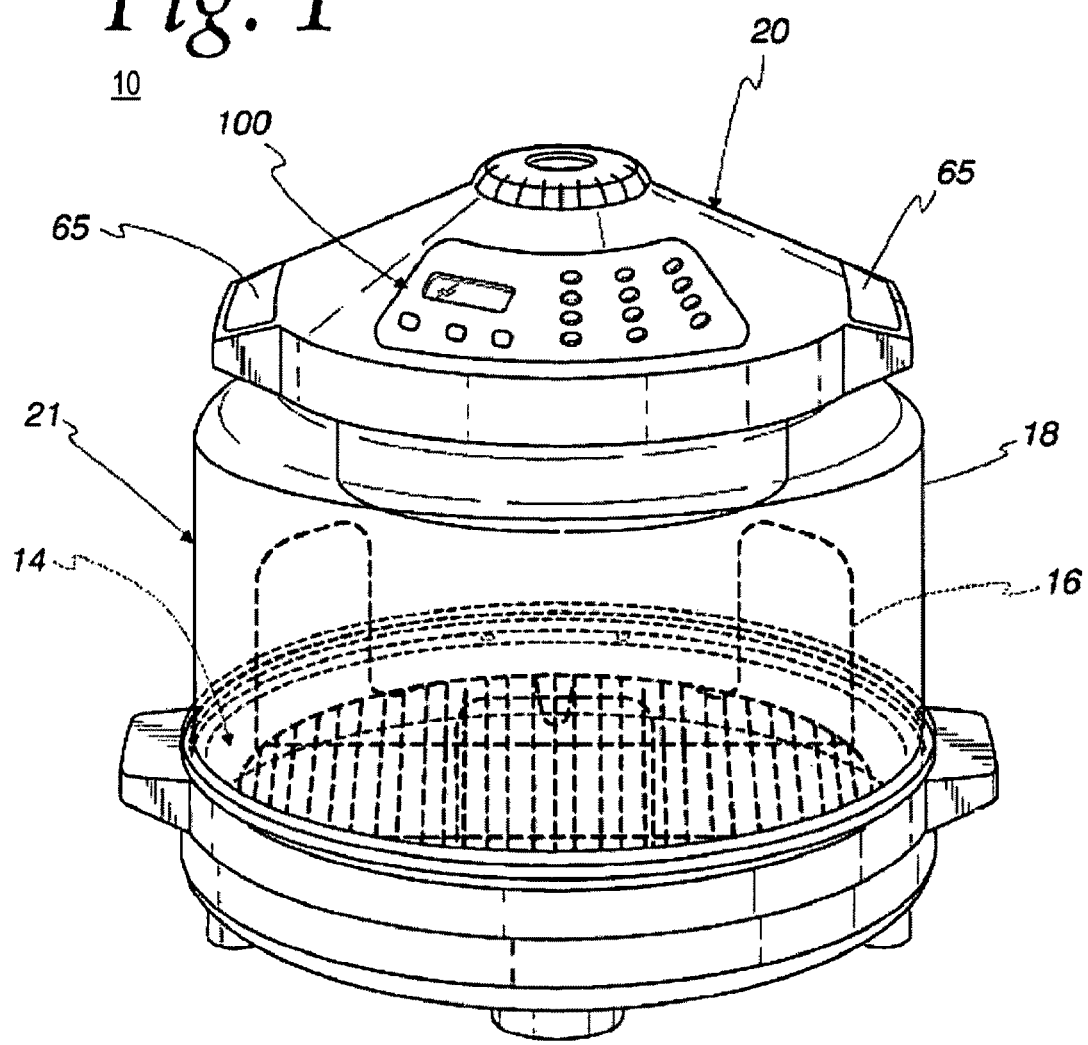
FIG. 1 depicts an exemplary embodiment of a perspective view of a counter-top infrared electric oven, according to an exemplary embodiment of the present invention.
Figure 2:
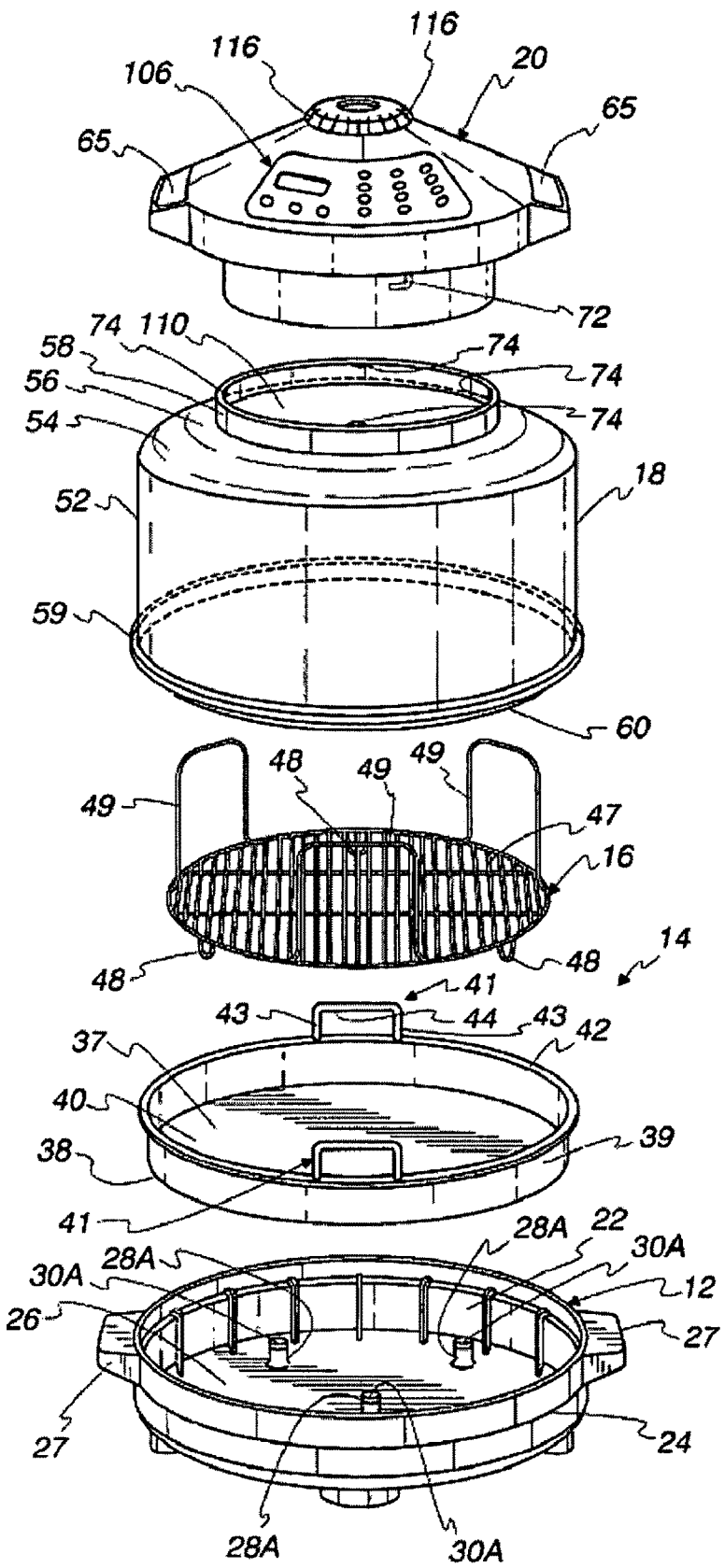
FIG. 2 depicts an exemplary embodiment of an exploded view of the oven shown in FIG. 1, according to an exemplary embodiment of the present invention.

Referring to FIGS. 1 and 2, an exemplary embodiment of a counter-top electric oven 10 may include a base 12, an oven pan 14 supported by the base 12, a cooking rack 16 supported by the oven pan 14, an oven housing 18, which may be cylindrical and transparent and may be supported by the base 12, and a power head 20 with handles 65 supported on the oven housing 18 and may be detachably connected to the oven 10. Together, the oven pan and the oven housing 18 may define an exemplary cooking enclosure 21 with the oven 10 as in the assembled state shown in FIG. 1.

Figure 3:
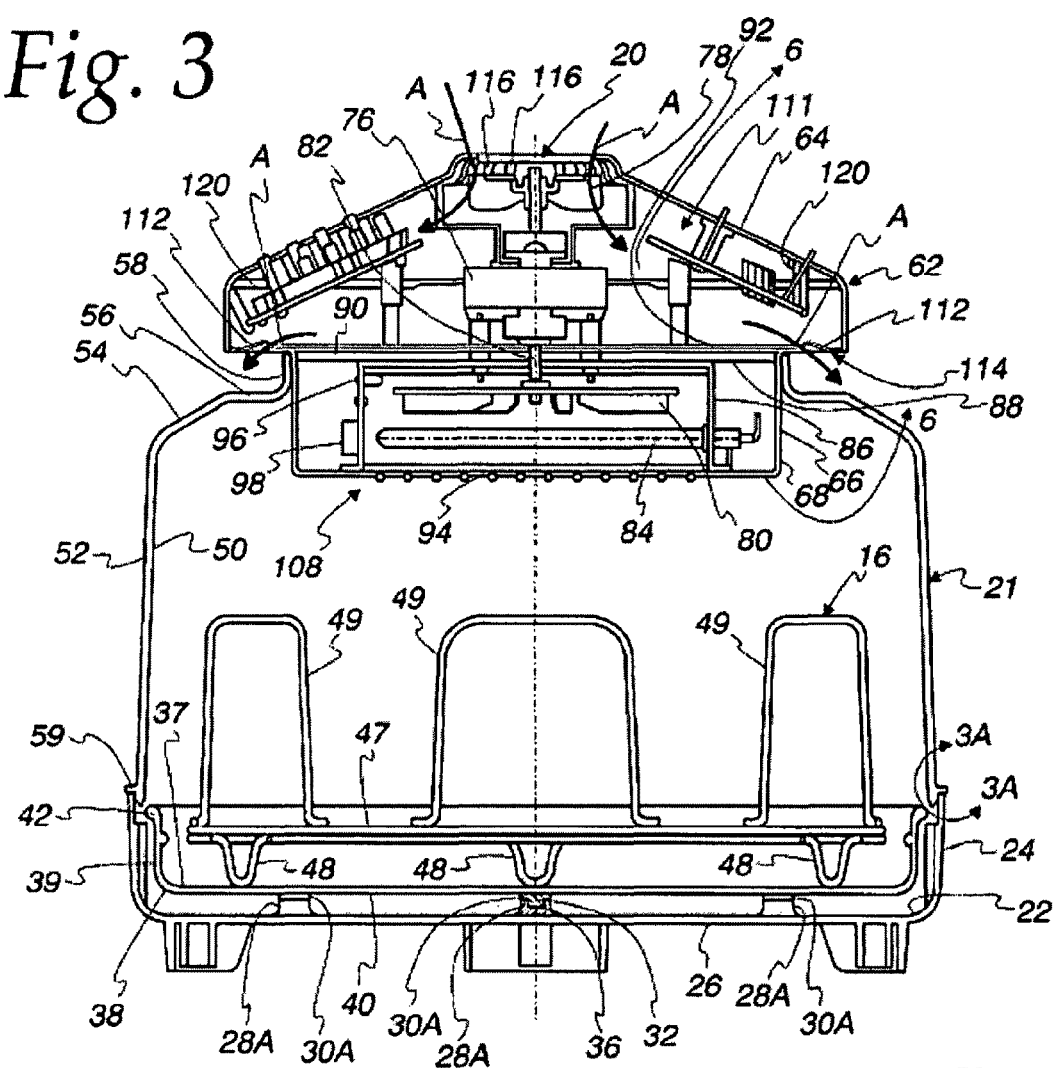
FIG. 3 depicts an exemplary embodiment of a section view of the oven shown in FIG. 1, according to an exemplary embodiment of the present invention.

According to an exemplary embodiment of the invention, as shown in FIGS. 2 and 3, the base 12 may have an interior surface 22 defined by a generally cylindrical side wall 24 and a planar bottom 26. In an exemplary embodiment, a pair of handles 27 may extend from the cylindrical side wall 24 to allow a user to move the oven from one location to another. According to an exemplary embodiment, the interior surface 22 may surround the oven pan 14 and may be spaced from the oven pan 14 by an air gap. The base 12 may further include one or more supports 28A, 28B, 28C (collectively 28) for the oven pan 14 and one or more thermal insulators 30 between the one or more supports 28 and the oven pan 14 to prevent overheating of the base 12 by the heat from the oven pan 14. In an exemplary embodiment shown in FIGS. 2 and 3, the one or more supports 28 may be provided in the form of three cylindrical pillars 28A, and the one or more thermal insulating spacers 30 may be provided in the form of three cylindrical spacers 30A, each supported by one of the pillars 28A. As seen in the section view of the spacer 30A and pillar 28A in FIG. 3, each of the spacers 30A, 30B, 30C (collectively 30) may include a cylindrical stub 32 that is engaged in a mating hole 36 in each pillar 28A to retain each of the spacers 30A to the respective pillar 28A. While the cross-sections of the spacers 30A and the pillars 28A may be generally circular, non-circular cross-sections, such as, e.g., but not limited to, triangular, oval, square, rectangular, trapezoidal, hexagonal, etc., may also be contemplated according to embodiments of the invention. According to an exemplary embodiment, the oven pan 14 may be supported on the insulators 30 to maintain the air gap between the interior surface 22 and the cooking pan 14 and to prevent overheating of the base 12, including the handles 27. In an exemplary embodiment, the plastic base 12 may be made from a polycarbonate material and the thermal insulators 30 may be made from a silicone rubber insulating material.

Figure 4:
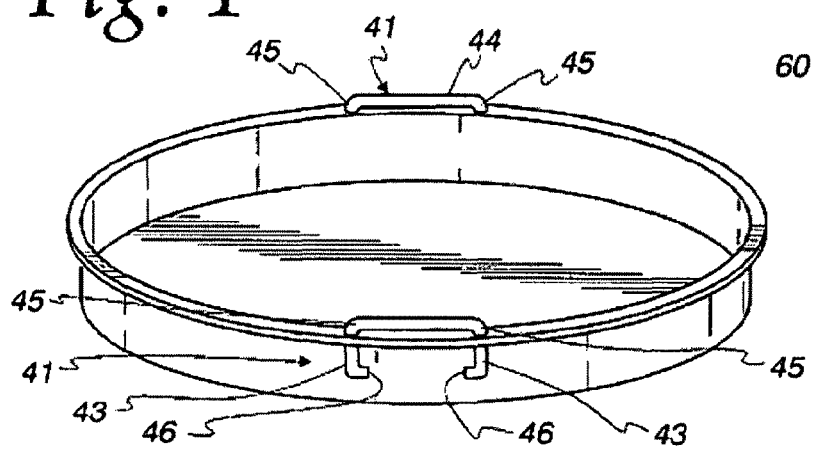
FIG. 4 depicts an exemplary embodiment of a perspective view of an oven pan of the oven shown in FIG. 1, according to an exemplary embodiment of the present invention.

In an exemplary embodiment, the metallic oven pan 14 may include an interior surface 37 and an exterior surface 38 defined by a cylindrical side wall 39 and a planar bottom 40. According to an exemplary embodiment, the oven pan 14 may be a one piece construction made of aluminum plate with a nonstick polytetrafluoroethylene (PTFE) coating on the interior surface 37. According to an exemplary embodiment, a pair of retractable handles 41 may be mounted to a lip 42 that defines an outer periphery of the oven pan 14. The handles 41 may be mounted to the lip 42 for movement between a first position, shown in FIG. 2, where the handles 41 are extended from the lip 42 so that a user may grasp the handles 41 to remove the pan 14 from the base 12, and a second position, shown in FIG. 4, where the handles 41 are retracted toward lip 42 to allow the oven housing 18 to be positioned above the oven pan 14, as shown in FIG. 3, without interfering with the handles 41. In an exemplary embodiment as shown in FIG. 4, each of the handles 41 may have a pair of legs 43 extending from a grasping member 44. In an exemplary embodiment, each of the legs 43 may be received in a vertical guide hole 45 formed in the lip 42 to guide the handles 41 between the first and second positions. Each of the legs may terminate in a tab 46 that engages the lip 42 with the handle 41 in the first position. According to an exemplary embodiment, the handles may be made from a unitary piece of metallic wire that is bent to form the grasping member, the legs 43, and the tabs 46.

According to an exemplary embodiment, the cooking rack 16 may include a planar grid 47 for supporting objects that are being cooked, a first set of loop projections 48 extending in one direction from the plane of the grid 47 and a second set of loop projections 49 extending in the opposite direction from the plane of the grid 47. In an exemplary embodiment, the projections 48 may be used to support the grid to provide a first cooking height for objects supported by the grid 47, while the projections 49 may be used to support the grid 47 to provide a second cooking height for the grid 47. According to an exemplary embodiment, the cooking rack 16 may be made from Grade 304 stainless steel with a non-stick PTFE coating.

Figure 3A:
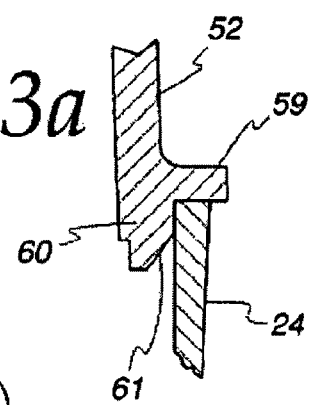
FIG. 3A depicts an exemplary embodiment of an enlarged view of the area indicated by lines 3A-3A in FIG. 3, according to an exemplary embodiment of the present invention.

In the embodiment as shown in FIG. 3, an exemplary embodiment of an oven housing 18 may include an interior surface 50 defined by a generally cylindrical side wall 52 that blends into a generally conical shaped side wall 54 which in turn blends into a planar upper wall 56 which finally blends into a generally cylindrical ring 58. An annular lip 59 may be formed on the outer surface of the wall 52 and serves to support the oven housing 18 on the side wall 24 of the base 12. A portion 60 of the wall 52 may extend below the lip 59 and may cooperate with the side wall 24 of the base 12 to restrict the leakage of hot gases, such as steam, from the cooking enclosure 21. In the embodiment as shown in FIG. 3A, the portion 60 may include an annular lead-in chamfer or relief 61 that serves to guide the portion 60 into the base 12, thereby easing the engagement of the oven housing 18 to the base 12 and preventing the mislocation of the housing 18 relative to the base 12. According to an exemplary embodiment, the oven housing 18 may be formed from a transparent polycarbonate material. The relief 61 may allow for the portion 60 to be flexibly inserted into the base 12 without precise vertical movement of the housing 18 relative to the base 12, such that the housing 18 can be inserted into the base 12 without having a perfect perpendicular angle relative to the base 12.

Figure 5:
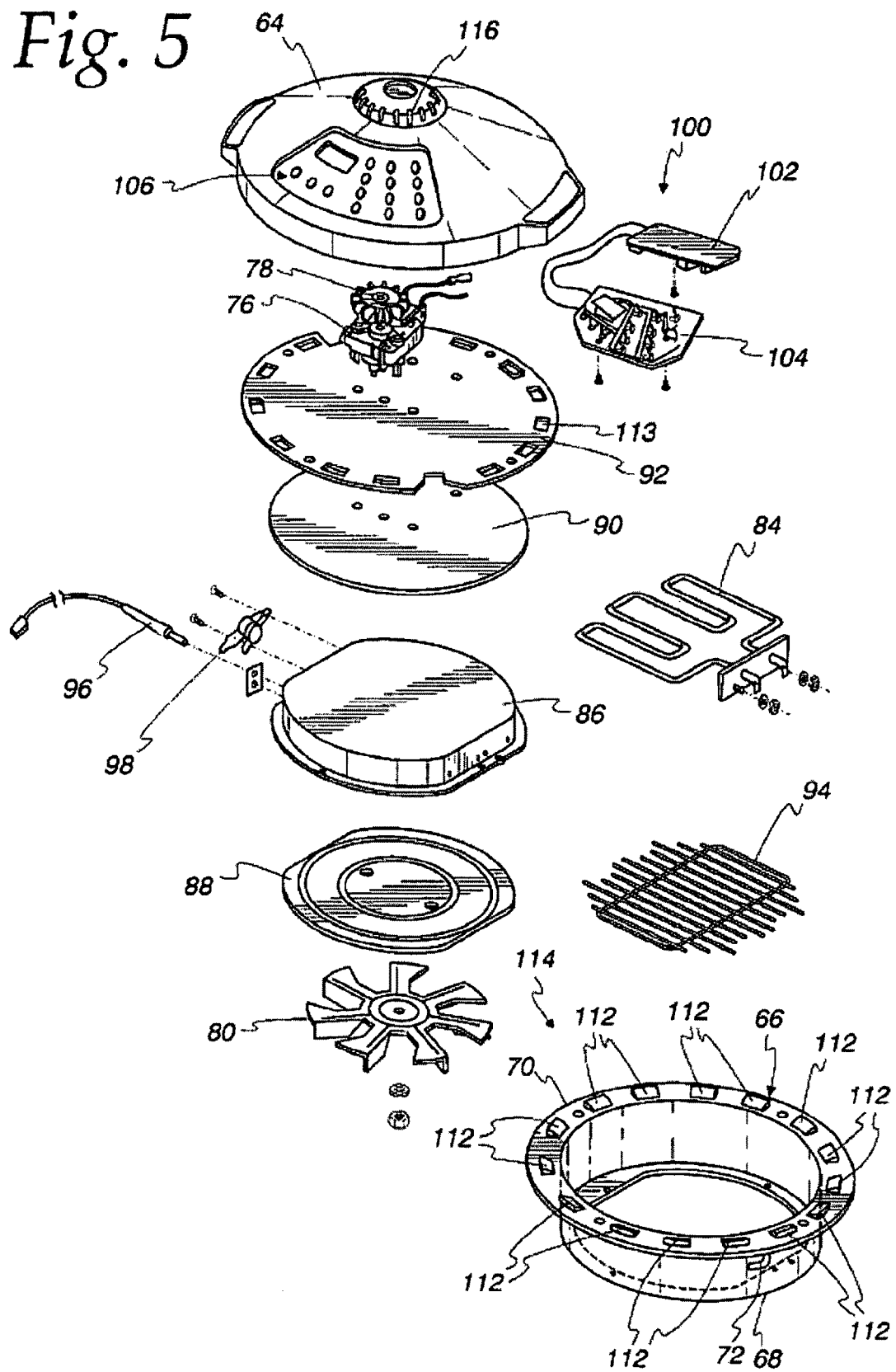
FIG. 5 depicts an exemplary embodiment of an exploded view of a power head of the oven shown in FIG. 1, according to an exemplary embodiment of the present invention.

In the embodiment as shown in FIGS. 3 and 5, the power head 20 may include exterior housing assembly 62. According to an exemplary embodiment, the assembly 62 may include a domed shape upper housing 64 having a pair of handles, and a lower housing 66 including a cylindrical wall portion and an annular flange 70. As seen in FIG. 2, according to an exemplary embodiment, four equally spaced lands 72 (only one shown) may be raised from the cylindrical wall 66 to engage a plurality of ramped tabs 74 formed on the ring 58 of the housing 18 to detachably connect the power head 20 and the housing 18. The power head 20 may further include a motor 76 for driving a cooling fan 78 and an oven fan 80 via a common shaft 82, an infrared electric heating element 84, a heater/fan housing 86, a radiation plate 88 mounted to an interior surface of the heater housing 86, a glass fiber thermal insulator 90 mounted between the heater housing 86 and the motor 76, a mica sheet 92 mounted between the upper housing 64 and the lower housing 66, a protective grid 94, a thermistor 96, a thermostat 98, and a control system 100 including a pair of control boards 102 and 104 for controlling the heating element 84 and the motor 76 in response to signals from the thermistor 96 and command signals input from an input interface 106 by a user. According to an exemplary embodiment, the fan 78 may be made of a plastic material, while the fan 80 and the radiation plate 88 may be made of aluminum plate in order to reflect the infrared energy from the heater 84 down toward the interior of the cooking enclosure 21. According to an exemplary embodiment, the motor 76 may drive the fans 78 and 80 at a speed in the range of 2500 rpm, which should provide an adequate air flow from the fan 80 to create a relatively even temperature throughout the cooking enclosure 21 and to speed the cooking of food by convection to supplement the infrared cooking, without generating the high speed air motion associated with some cyclonic electric counter-top ovens. The relatively low speed air flow created by the fan 80 may also provide another benefit in that it may help to maintain the hot surfaces of the oven 10 in a temperature range that may tend to emit infrared radiation and limit the reduction in emissivity of the non-metal materials of the oven 10. In an exemplary embodiment, the heating element 84 may be made of an incoloy 840 material coated with a G-1500 (CRC 1500) ceramic coating having a coating thickness of 20.+−0.5 μm, with the main components of the coating material being $SiO_2$, $TiO_2$, and $Al_2O_3$, with an inorganic pigment, mainly Si—O. The ceramic coating may increase the emissive power of the heating element and shift the emission spectrum to the infrared range. With this coating, the heating element 84 may be capable of generating approximately 98% or more of its heat radiation in the infrared range. A sol-gel coating method may be used for coating the ceramic material firmly onto the incoloy 840 material. Infrared electric heating elements of this construction have been used in the past on hair dryers, bread makers, etc. The grid 94 may be made of 304 stainless steel or from a PTFE coated metallic material. According to an exemplary embodiment, the upper housing 64 may be made from a polycarbonate material and the lower housing and the heater housing may be made from zinc plated steel or steel coated with a non-stick PTFE coating.

Together, the cylindrical wall portion 68 of the lower housing 66, the heater housing 86, the radiation plate 88, the fan 80, and the heating element 84 may define an exemplary heating unit 108 that may extend into the cooking enclosure 21 through an opening 110 defined by the cylindrical portion 58 of the housing 18. Together, the upper housing 64 and the mica sheet 92 may define an exemplary fan chamber 111 that may be thermally insulated from the interior of the cooking enclosure 21 by the mica sheet 92, the glass fiber insulator 90, the heater housing 86, the radiation plate 88, and the lower housing 66. In an exemplary embodiment as shown in FIGS. 3 and 5, a plurality of cooling air outlets 112 may form in the annular flange 70 of the lower housing 66. Cut-outs 113 may be provided in the mica sheet 92 to prevent interference between the outlets 112 and the mica sheet 92 and to allow a cooling air flow to pass through the mica sheet 92 to the outlets 112. The outlets 112 may be equally circumferentially spaced around the flange 70.

Together the flange 70 and the outlets 112 may define an exemplary cooling manifold 114 that surrounds the opening 110 of the housing 18 and faces the surface 56 outside of the cooking enclosure 21. The cooling fan 78 may actively cool the fan chamber 111 and the walls 52, 54, 56 and 58 of the housing 18 by drawing a cooling air flow through a plurality of inlet openings 116 formed in the upper housing 64 and forcing the cooling air to exit through the outlets 112, which direct the cooling air flow toward the surface 56 of the housing 18 to cool the housing 18, as indicated by arrows A.

Figure 6:
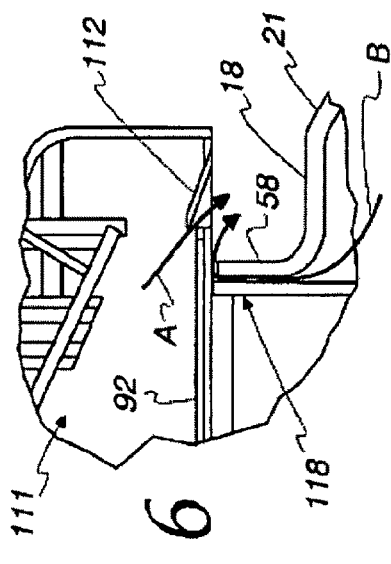
FIG. 6 depicts an exemplary embodiment of an enlarged view of the area indicated by lines 6-6 in FIG. 3, according to an exemplary embodiment of the present invention.

In the embodiment as shown in FIG. 6, the wall 68 and the flange 70 may be spaced from the cylindrical ring 58 of the housing 18 by the tabs 74 to define an exemplary hot gas vent 118 that surrounds the heating unit 108 between the heating unit 108 and the outlets 112 to vent hot gas, such as steam, from the inside of the cooking enclosure 21 for mixture with the cooling air flow from the air outlets 112, as shown by the arrow B.

According to an exemplary embodiment, the control boards 102 and 104 may be spaced from the interior surface of the upper housing 64 by a plurality of mount supports 120 to allow the cooling air flow to pass over both sides of the control boards 102 and 104 as it circulates around the fan chamber 111 before exiting through the outlets 112, thereby enhancing the cooling of the electronics on the control boards 102 and 104.

Figure 7:
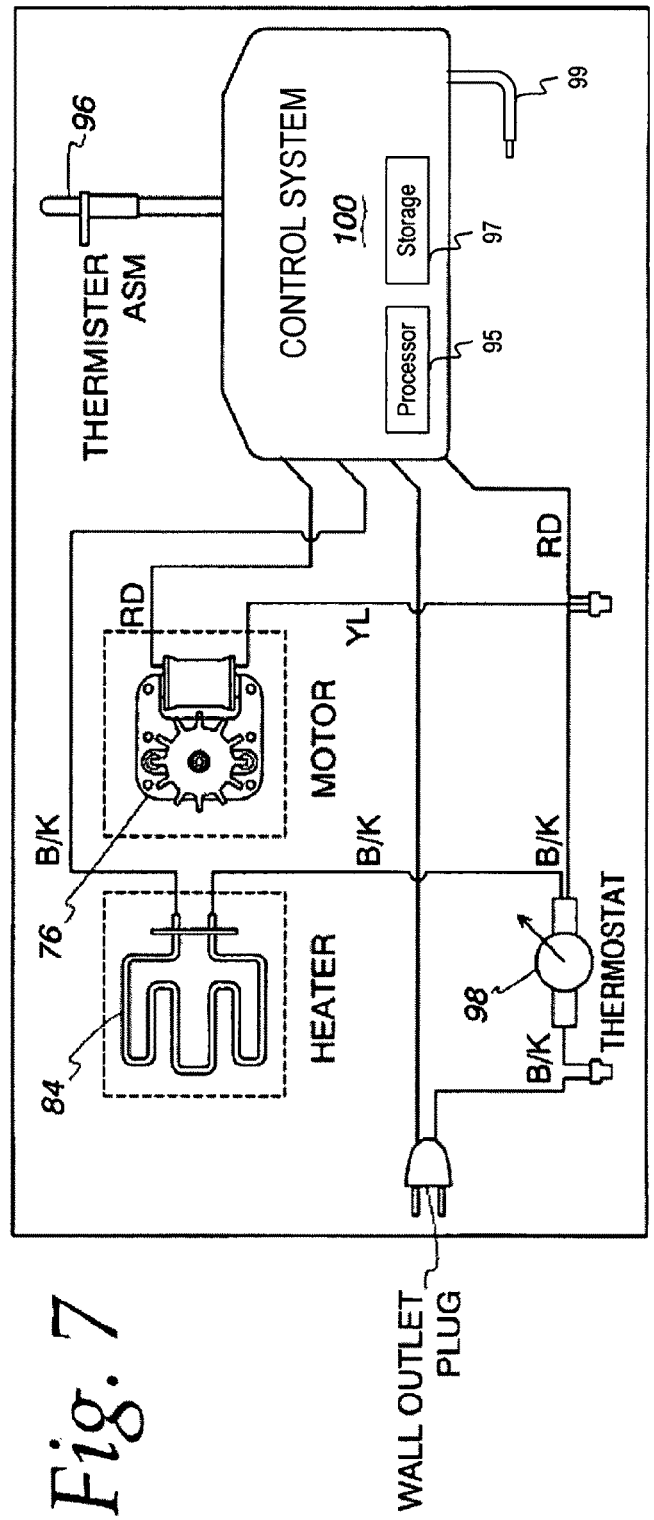
FIG. 7 depicts an exemplary embodiment of a diagrammatic representation of the operating components of the oven shown in FIG. 1, according to an exemplary embodiment of the present invention.

In an exemplary embodiment as shown in FIG. 7, the control system 100 may be coupled to the motor 76 and the heating element 84 to control the flow of electric power to the motor 76 and to one or more heating elements 84 in response to signals from the thermostat 98 and command signal input from the input interface 106 by a user (not shown). According to an exemplary embodiment, the control system 100 may be configured to selectively power the heating element 84 at a number of power levels P from a minimum power to a maximum power. At each power increment P, the control system 100 may power the heating element(s) 84 when the thermistor 96 indicates that the temperature in the cooking enclosure 21 has fallen below a low temperature set point associated with the particular power level P. The control system 100 then may terminate power to the heating element 84 when the temperature indicated by the thermistor 96 exceeds a high temperature set point associated with the particular power level P. The control system may provide power continuously to the motor 76 during the heating operations regardless of the power level selected. According to one exemplary embodiment, a multi-stage cooking recipe may be input, processed, stored, accessed, executed and/or deleted by the control system 100.

An exemplary embodiment of the control system 100 may also include a processor 95, and a storage device 97, such as, e.g., but not limited to, a memory, a register, a read-only memory (ROM), a random access memory (RAM), a solid state memory device, a flash memory device, a hard disk drive (HDD), a removeable disk device such as, e.g., but not limited to, a CD-ROM, a DVD, etc. According to an exemplary embodiment, command signal input from the input interface 106 (such as, e.g., but not limited to, a keyboard, a keypad, a remote control, a voice activated interface, a voice recognition system, etc.) by a user may be received by the processor 95 and storage device 97 to create a multi-stage cooking recipe that may be further edited or executed. In an exemplary embodiment the multi-stage cooking recipe may be stored in the storage device 97 in the form of volatile memory for temporary storage, nonvolatile memory for permanent storage, or both. During execution the processor 95 may receive input from a variety of sources to determine what and when stages should be executed.

In an exemplary embodiment, the oven may further include a temperature probe 99. In an exemplary embodiment, the temperature probe 99 may be detachable from the oven for, e.g., but not limited to, cleaning, etc. The probe 99 may be physically connected to the oven during use or may be coupled, such as, e.g., but not limited to, through wireless communication, with the oven. In an exemplary embodiment, the temperature probe 99 may be attached to the oven and may or may not be removable from the oven. The temperature probe 99 may be inserted into objects being cooked so that information regarding the interior of the object, such as, e.g., but not limited to, temperature, level of doneness, etc., can be determined. The probe 99 information may be received by the processor 95 and may be used in the multi-stage cooking recipe programming and/or execution.

Figure 8B:
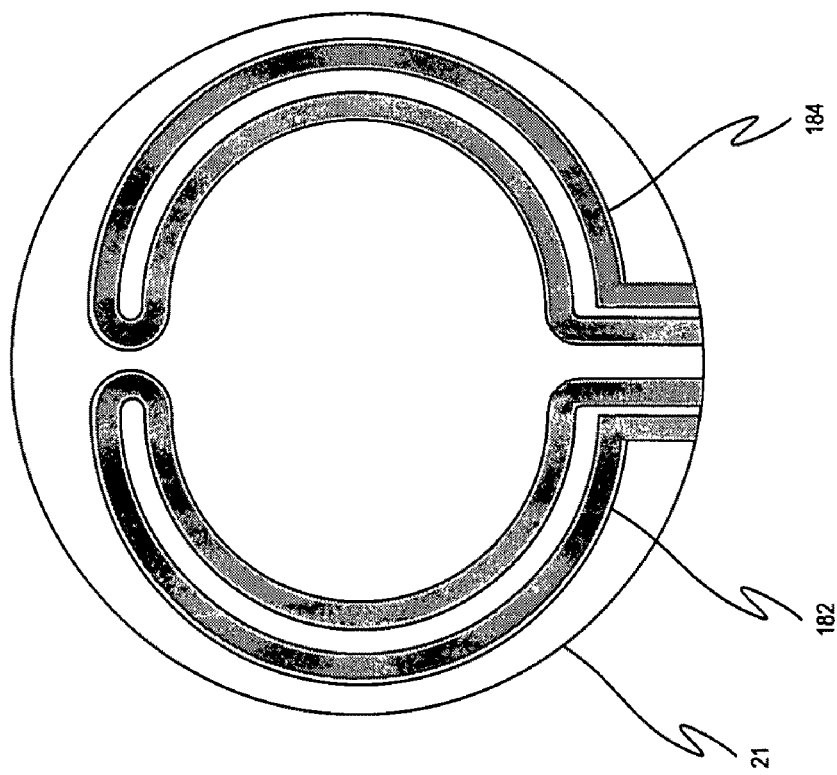
FIGS. 8A-B depicts exemplary embodiments of heat element arrangements, according to an exemplary embodiment of the present invention.
Figure 8A:
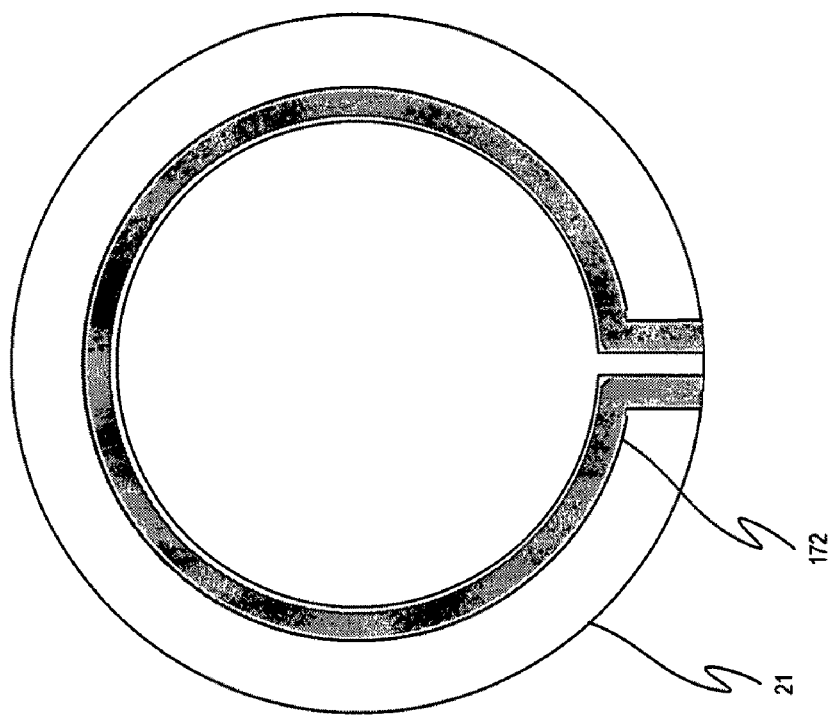

In the exemplary embodiment as shown in FIG. 8B, the oven may include a plurality of heating element 182, 184. The heating element(s) 182, 184 may have a top and bottom configuration, a side to side configuration, or some other configuration. In an exemplary embodiment, the heating elements may have individually selectable power levels, linked selectable power levels, and/or some combination. In an exemplary embodiment, the oven may include heating element(s) 172, 182, 184 on the bottom of the oven. In an exemplary embodiment, the heating element(s) 172, 182, 184 ma y be arranged such that drippings from the object being cooked do not fall upon the heating element(s) 172, 182, 184, such as, e.g., but not limited to, arranging a heating element 172 in a circular shape 170 around the cooking enclosure 21, as shown in FIG. 8A, or arranging two semi-circular heating elements 182, 184 in a circular shape 180, as shown in FIG. 8B, etc.

Figure 9A:
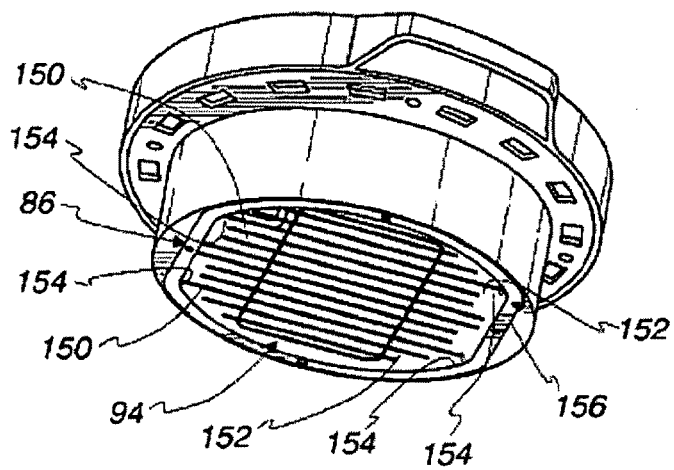
FIGS. 9A-D depicts exemplary embodiments of perspective views illustrating the mounting and the removal of a protective grid of the oven shown in FIG. 1, according to an exemplary embodiment of the present invention.
Figure 9B:
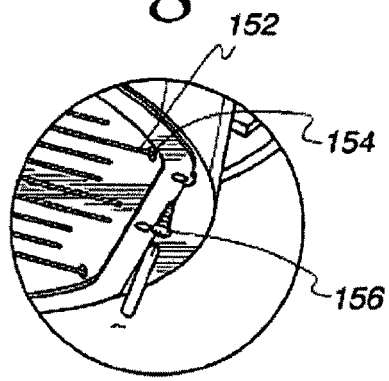
Figure 9C:
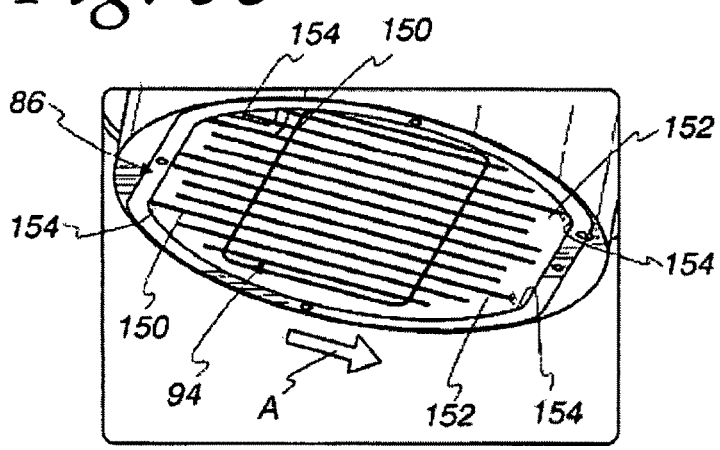
Figure 9D:
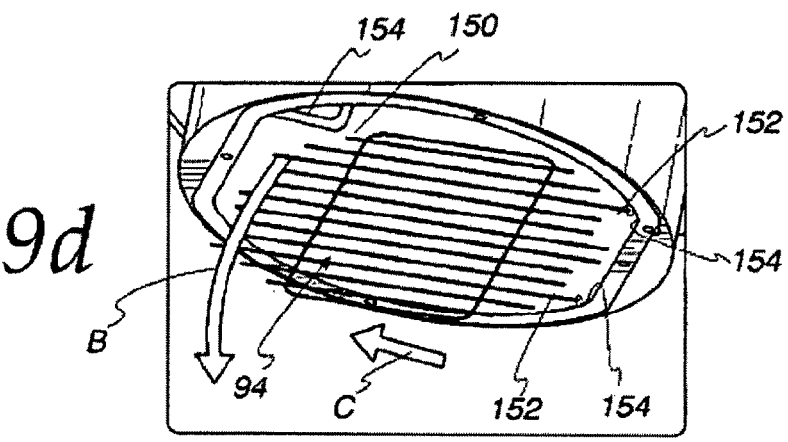

In an exemplary embodiment as shown in FIG. 9a, the protective grid 94 may include a first pair of legs 150 that may be oppositely directed relative to a second pair of legs 152. In an exemplary embodiment as shown in FIG. 9b, each of the exemplary legs 150, 152, may be slidably received in a mating aperture 154 in the heater housing 86 to detachably mount the protective grid 94 to the heater housing 86. A fastener 156 may be engaged with the heater housing 86 for movement between a first position shown in FIG. 9a where the fastener engages one of the legs 152 to restrict movement of the grid 94 relative to the heater housing 86 to prevent removal of the grid 94 from the heater housing 86, and a second position shown in FIG. 9b where the fastener may be disengaged from the one leg 152 to allow removal of the grid 94 from the heater housing 86. In the exemplary embodiment as shown in FIG. 9b, the fastener 156 may be provided in the form of a threaded set screw that is threadably engaged with the housing 86, with the end of the set screw frictionally engaging the one leg 152 in the first position shown in FIG. 9a. In this regard, it should be noted that for the fastener to be in the second position it need not be completely removed from the housing 86 as shown in FIG. 9b, rather, the fastener 156 need only be positioned so that it is disengaged from the one leg 152 to allow movement of the grid 94 relative to the housing 86. In the exemplary embodiment as shown in FIG. 9c, with the exemplary fastener 156 in the second position, the legs 152 may be slid in the apertures 154 to allow the grid 94 to move relative to the housing 86 in the direction of the legs 152, as indicated by Arrow A, to thereby remove the legs 150 from their mating apertures 154. Once the exemplary legs 150 are removed from their mating apertures 154, the grid 94 may be tilted downward as shown by the arrow B in FIG. 9d and then the grid 94 may be moved in the direction of the legs 150, as indicated by Arrow C, to thereby remove the legs 152 from their mating apertures 154 and thus, the grid 94 from the housing 86. Removal of the exemplary grid allows for cleaning of the heating element 84, the fan 80, the reflector plate 88, and the interior of the housing 86.

Figure 10:
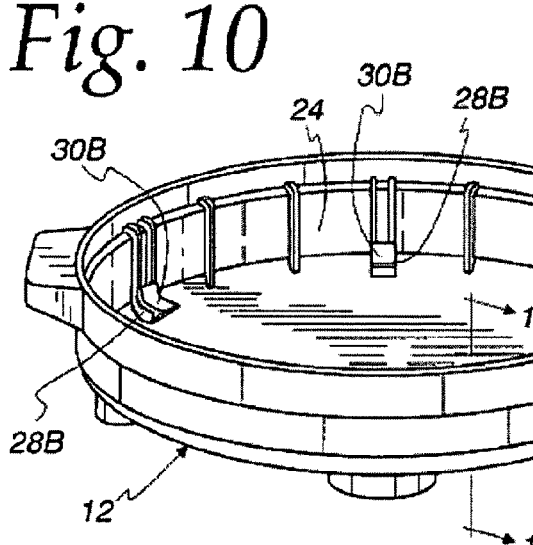
FIG. 10 depicts an exemplary embodiment of a perspective view of an optional embodiment of a base for the oven shown in FIG. 1, according to an exemplary embodiment of the present invention.
Figure 11:
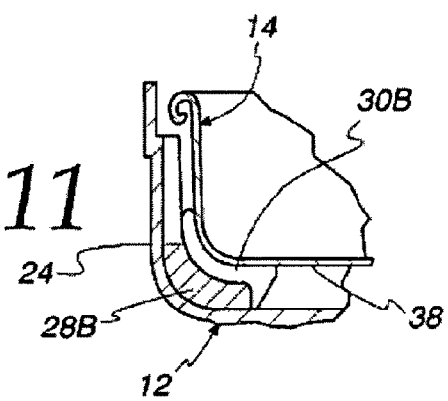
FIG. 11 depicts an exemplary embodiment of an enlarged, fragmentary section view taken substantially along line 11-11 in FIG. 10, according to an exemplary embodiment of the present invention.

In the exemplary embodiments as shown in FIGS. 10 and 11, in an alternative embodiment of the base 12, the one or more supports 28 may be provided in the form of three or more circumferentially spaced feet 28B that extend from the side wall 24 to underlie the oven pan 14, and the thermal insulators 30 may be provided in the form of three or more thermal insulating spacers 30B, each supported by one of the feet 28B.

Figure 12:
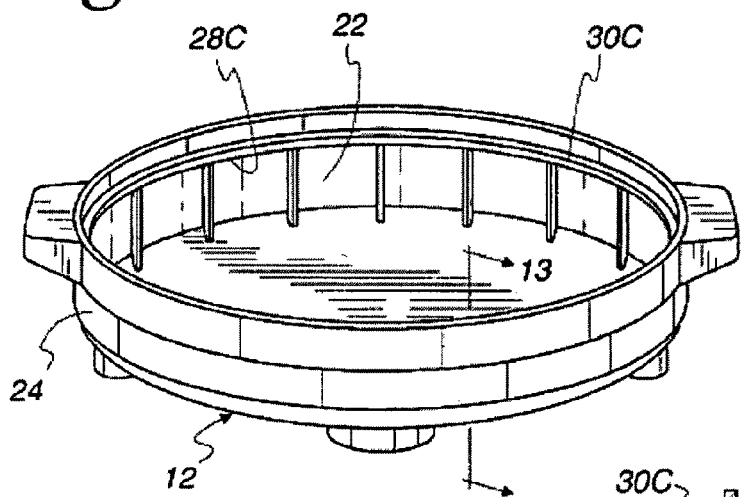
FIG. 12 depicts an exemplary embodiment of a perspective view of another optional embodiment of a base 10 for the oven shown in FIG. 1, according to an exemplary embodiment of the present invention.
Figure 13:
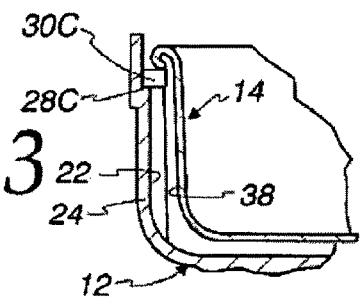
FIG. 13 depicts an exemplary embodiment of an enlarged, fragmentary section view taken substantially along line 13-13 in FIG. 12, according to an exemplary embodiment of the present invention.

In the exemplary embodiments as shown in FIGS. 12 and 13, in an alternative embodiment of the base 12, the one or more supports 28 may be provided in the form of an annular shoulder 28C formed on the interior surface 22 of the base 12, and the one or more insulators 30 may be provided in the form of a thermal insulating ring 30C that is supported by the shoulder 28C.

Figure 14A:
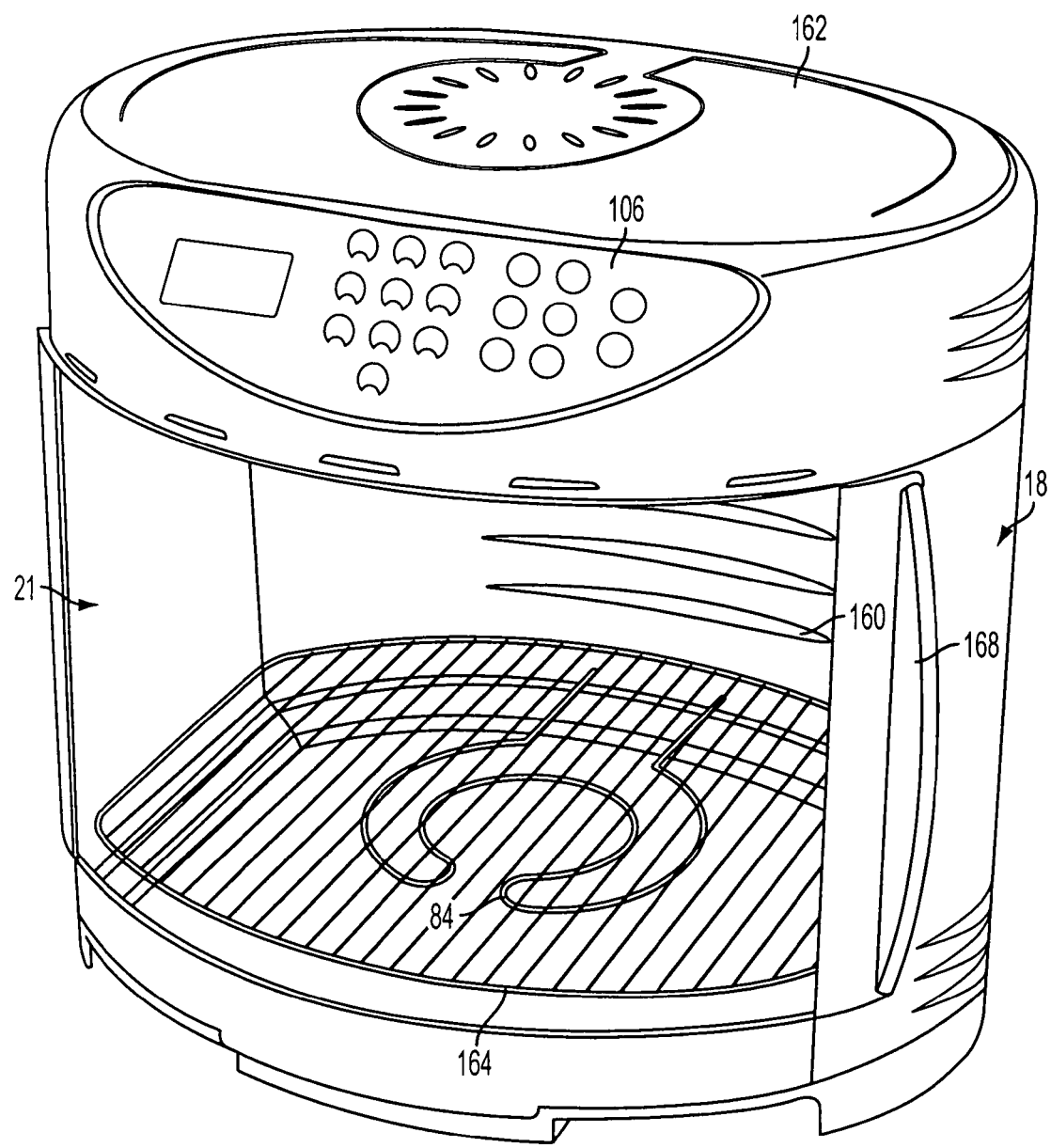
FIGS. 14A-B depict an exemplary embodiment of isometric views of exemplary embodiments of the present invention.
Figure 14B:
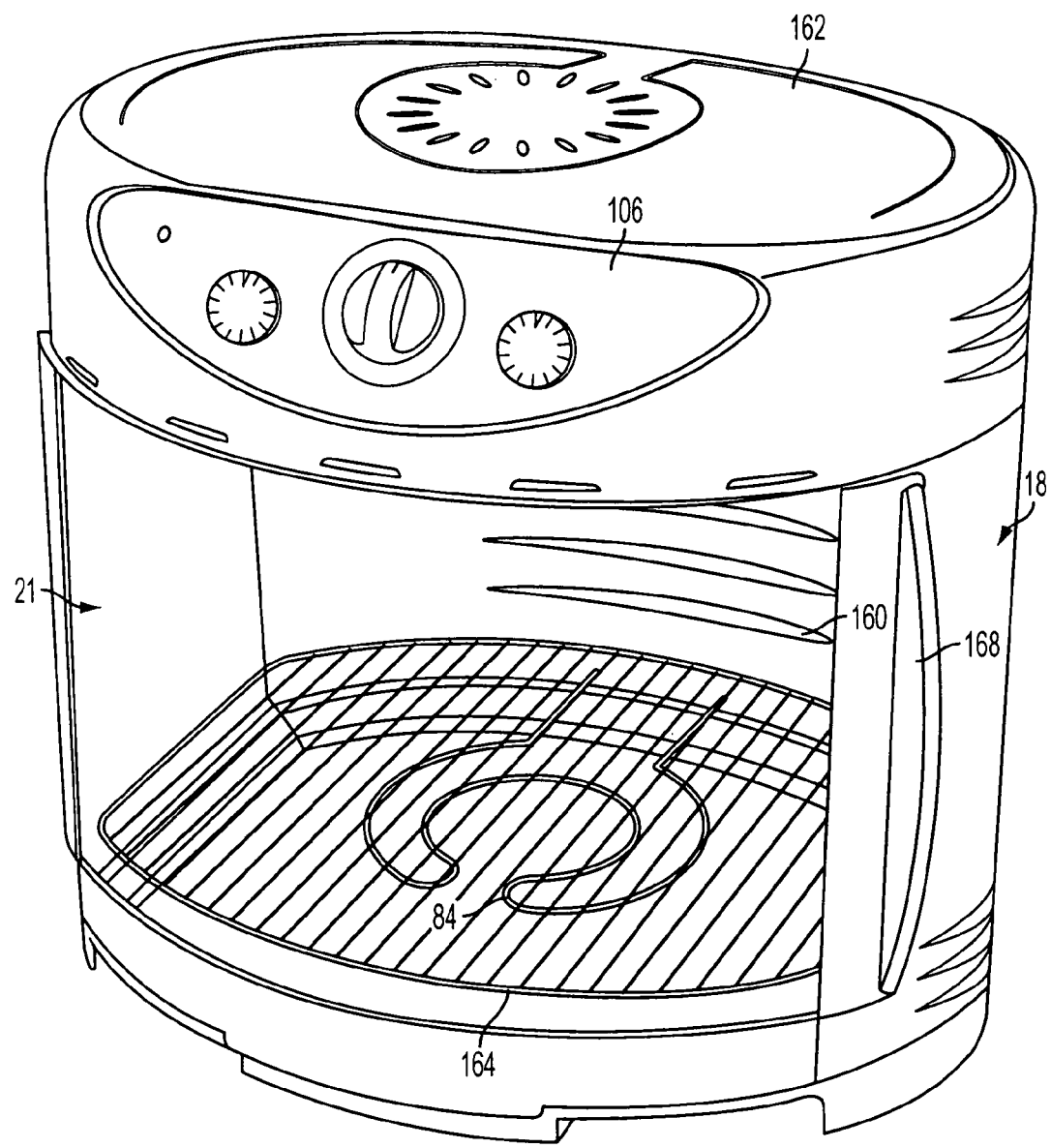
Figure 15:
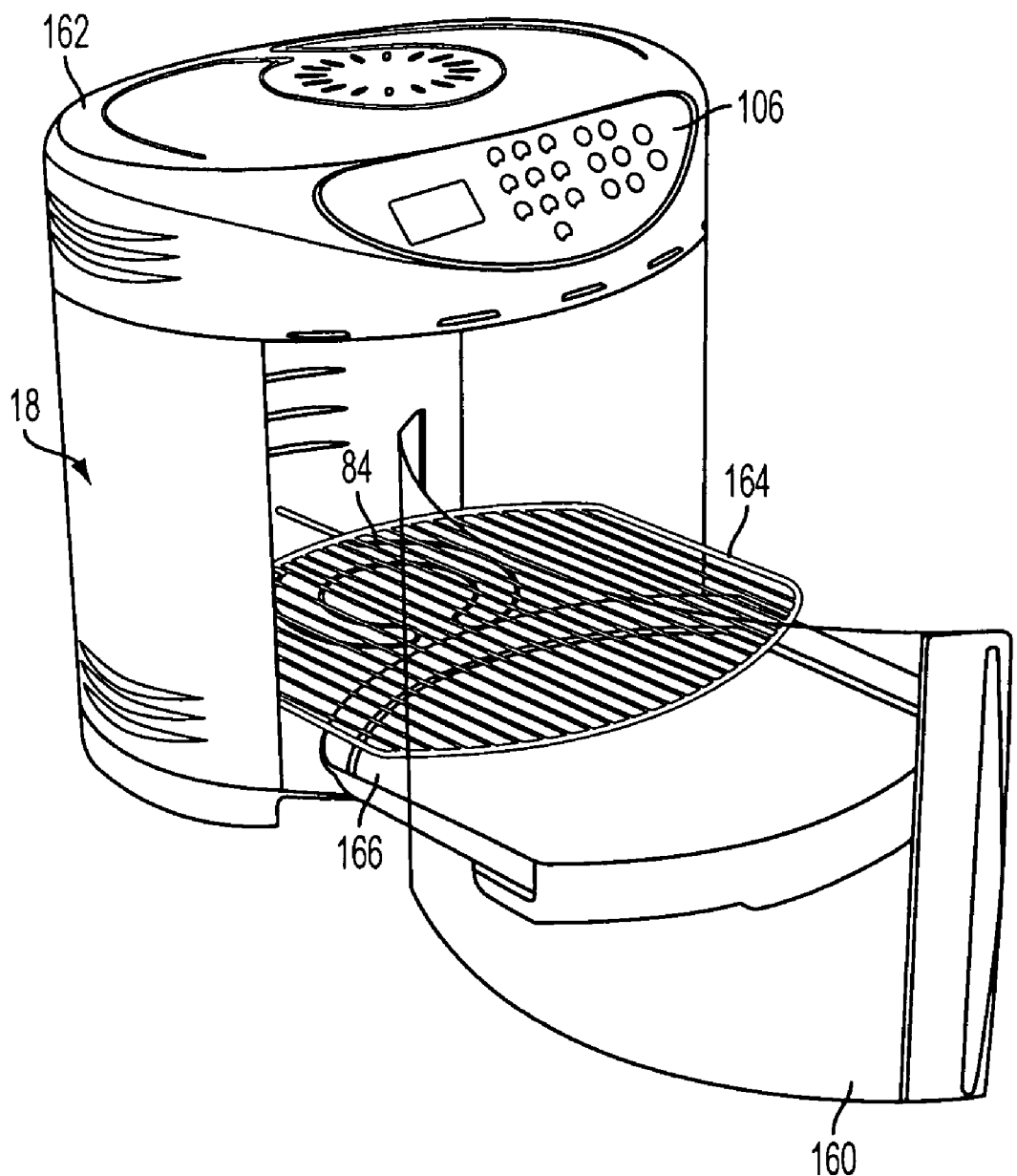
FIG. 15 depicts an exemplary embodiment of an isometric exploded view of an exemplary embodiment of the present invention.
Figure 16A:
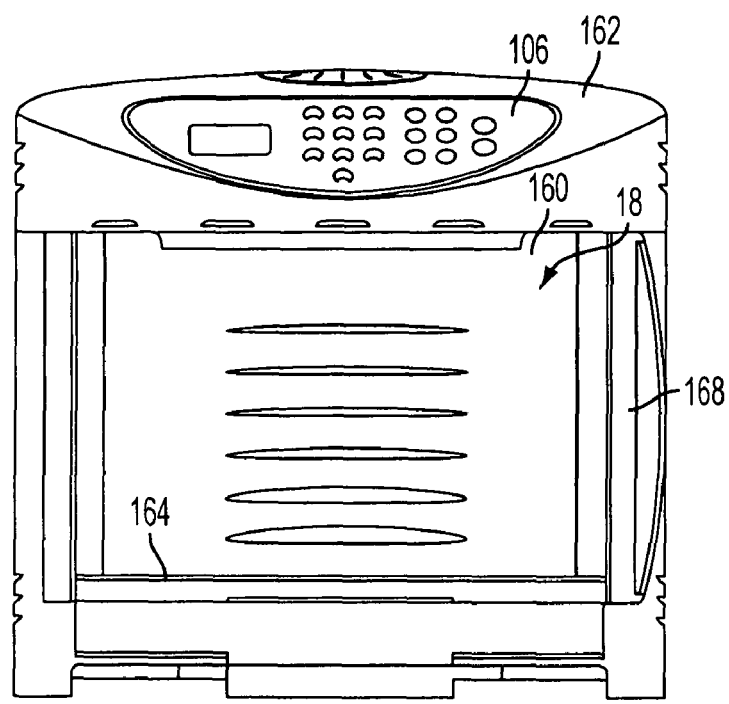
FIGS. 16A-16B depict a front and side view of an exemplary embodiment of the present invention.
Figure 16B:
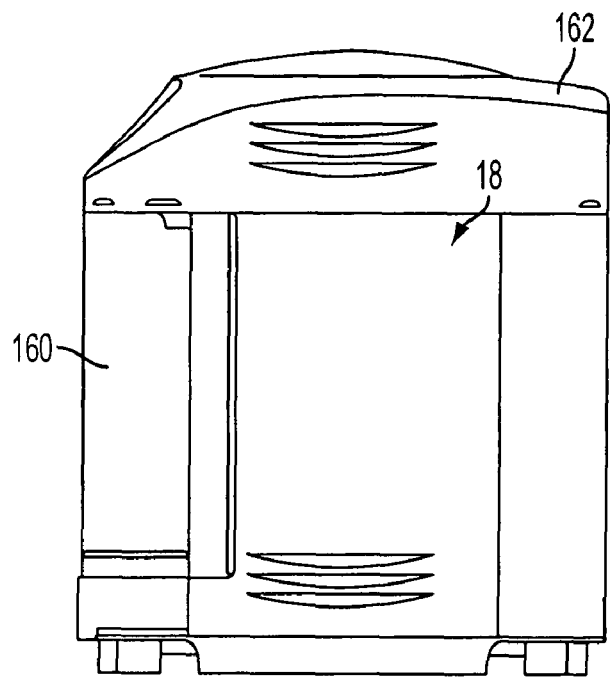

In the exemplary embodiments as shown in the various perspectives of FIGS. 14A, 14B, 15, 16A and 16B, the cooking enclosure 21 may include metal and/or glass such that the oven can sustain a higher maximum temperature than an oven composed of polycarbonate can sustain. According to an exemplary embodiment, the oven may include a digital interface, as shown in FIG. 14A, and/or an analog interface, as shown in FIG. 14B. According to an exemplary embodiment, the cooking enclosure 21 may include a non-detachable power head 162 and/or a hinged and/or sliding glass door 160 that may be opened to insert and remove objects from the oven. In an exemplary embodiment the oven housing 18 may include a groove 168 along the edge of the glass door for grip. In an exemplary embodiment depicts in FIG. 15, the hinged and/or sliding glass door 160 may be detached for easy cleaning. In another exemplary embodiment, the cooking enclosure 21 may include a door which is slidable (not shown). In an exemplary embodiment the oven may include a slidably removable cooking rack 164 and a slidably removable oven pan 166. In an exemplary embodiment, the oven can be adapted to receive a rotisserie. According to an exemplary embodiment the oven may include a side or top view which may be, e.g., but not limited to, a circular shape, an oval shape, or any number of other shapes such as, e.g., but not limited to, triangular, square, rectangular, trapezoidal, octagonal, polygonal, pentagonal and/or hexagonal, etc.

In a further embodiment, the oven may also include a small window (not shown) that can be optionally opened to let steam or moisture out of the oven, allowing the food to cook crispier. In an exemplary embodiment, the window may be a small glass door arranged on the glass door 160, though the window may also be arranged elsewhere on the oven. In an exemplary embodiment, the window may be sliding or folding and may be, e.g., but not limited to, 20 mm×50 mm in size. In an alternative embodiment, the window may be a hole plugged in with non-conductive material such as, e.g., but not limited to, silicon rubber, which may be unplugged to let moisture or steam out.

Figure 17:
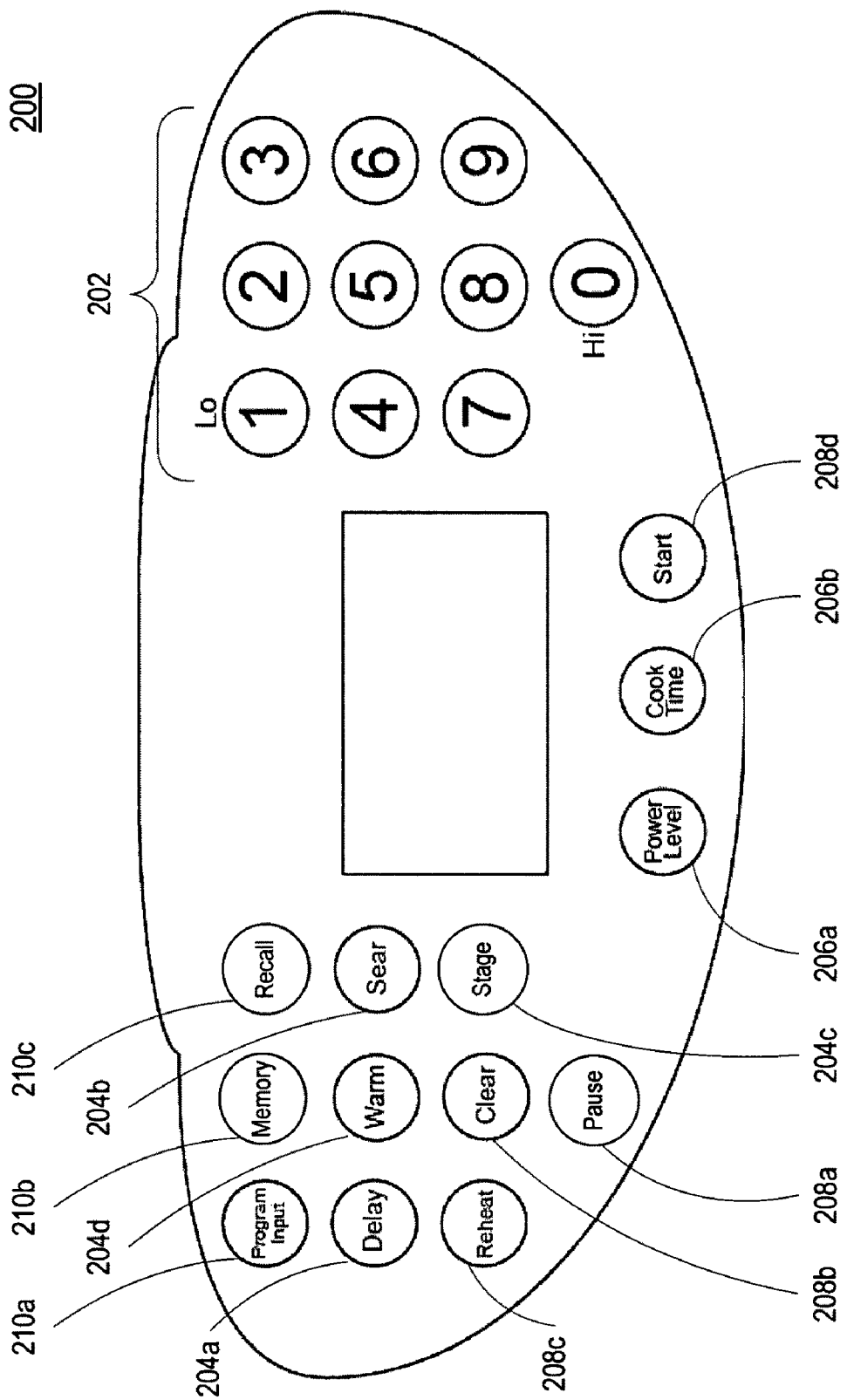
FIG. 17 depicts an exemplary embodiment of an input interface of an exemplary embodiment of a multi-stage cooking electric oven.

FIG. 17 depicts an exemplary input interface 200 of an exemplary embodiment of a multi-stage cooking electric oven. The input interface 200 may include, e.g., but not limited to, a numeric keypad 202 by which numerical values can be inputted into the oven for values such as, e.g., but not limited to, the power level, time duration of cooking, desired temperature, level of doneness, memory address, etc. Alternatively, a voice recognition and/or other input interface 200 may be included. The input interface 200 may also include control elements corresponding to various stages of a recipe including, e.g., but not limited to, a delay stage 204a, a sear stage 204b, a 204c, and/or a warm stage 204d, etc. The input interface 200 may also include control elements for programming information for each stage including, e.g., but not limited to, power level 206a, cook time 206b, etc. The input interface 200 may also include control elements for commands such as, e.g., but not limited to, pause 208a, clear 208b, reheat 208c, start 208d, etc. The input interface 200 may also include control elements for programming functions such as, e.g., but not limited to, program input 210a, memory 210b, recall 210c, etc.

Figure 18:
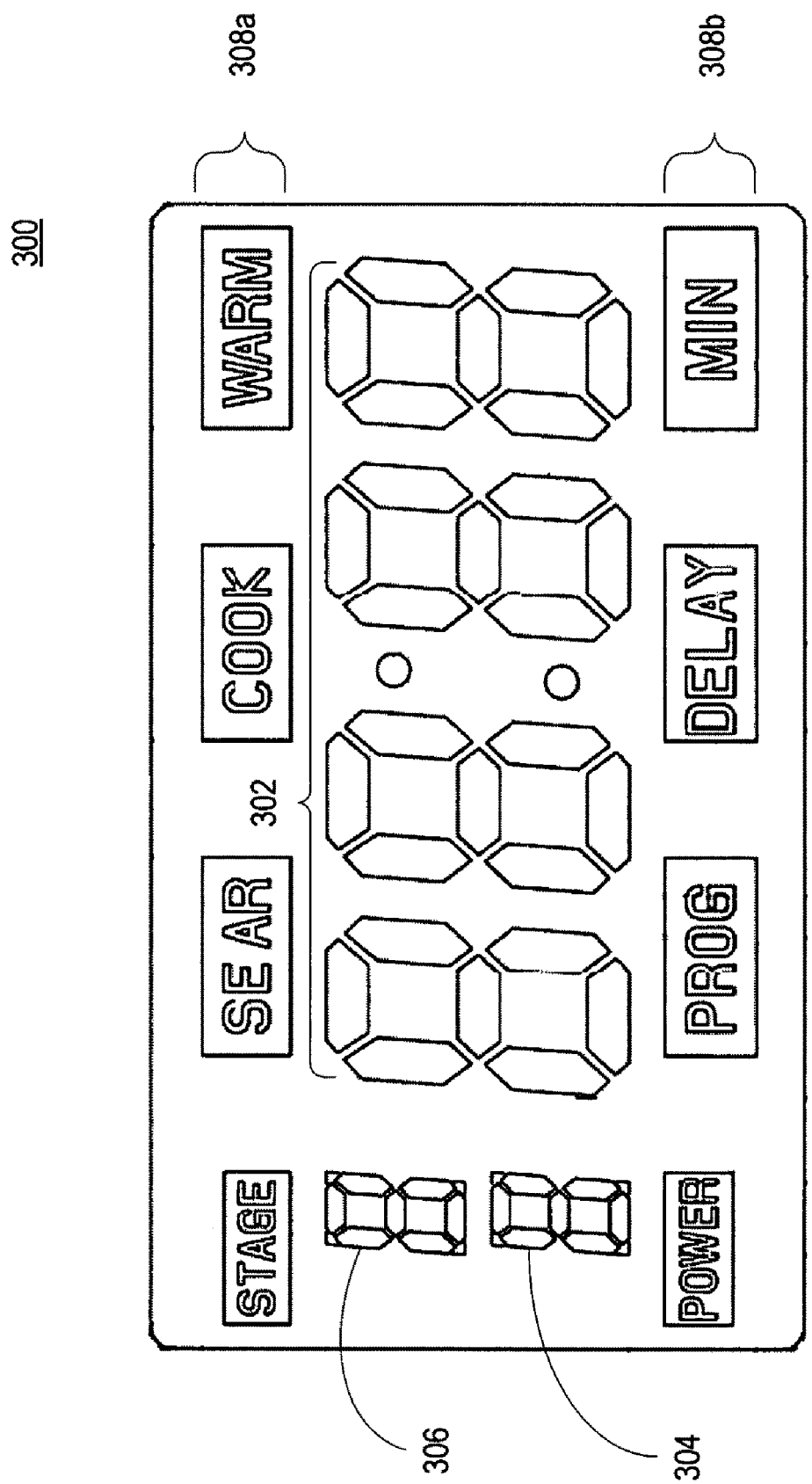
FIG. 18 depicts an exemplary embodiment of a numeric display panel of an exemplary embodiment of a multi-stage cooking electric oven.

An exemplary display panel 300 of an exemplary embodiment of a multi-stage cooking electric oven is shown in FIG. 18. The exemplary display panel 300 can show multi-stage cooking recipe information such as, e.g. but not limited to, time, power level, and/or stage, etc. The exemplary display panel 300 may include an area in which a numerical value can be displayed, in the exemplary embodiment, comprising of four seven-segment displays 302. The numerical value can represent information regarding, e.g., but not limited to, the duration time, duration of time left, memory address to save and/or load a multi-stage cooking recipe, etc. The exemplary display panel 300 may also include, e.g., but not limited to, a display in which the power level of a stage can be displayed 304. Another display, in the exemplary embodiment may show the stage number 306. The exemplary display panel 300 may also include, e.g., but not limited to, indicators 308a,

308b for each type of stage or type of programming information needed. In the exemplary embodiment, the indicators may represent POWER, PROG, DELAY, MIN, STAGE, SEAR, COOK and/or WARM. In an exemplary embodiment, these indicators may blink when their corresponding information may be entered and may remain lit after their corresponding information is set. According to an exemplary embodiment, during execution these indicators may light up to indicate which stage is being executed and which stages may remain.

Figure 19:
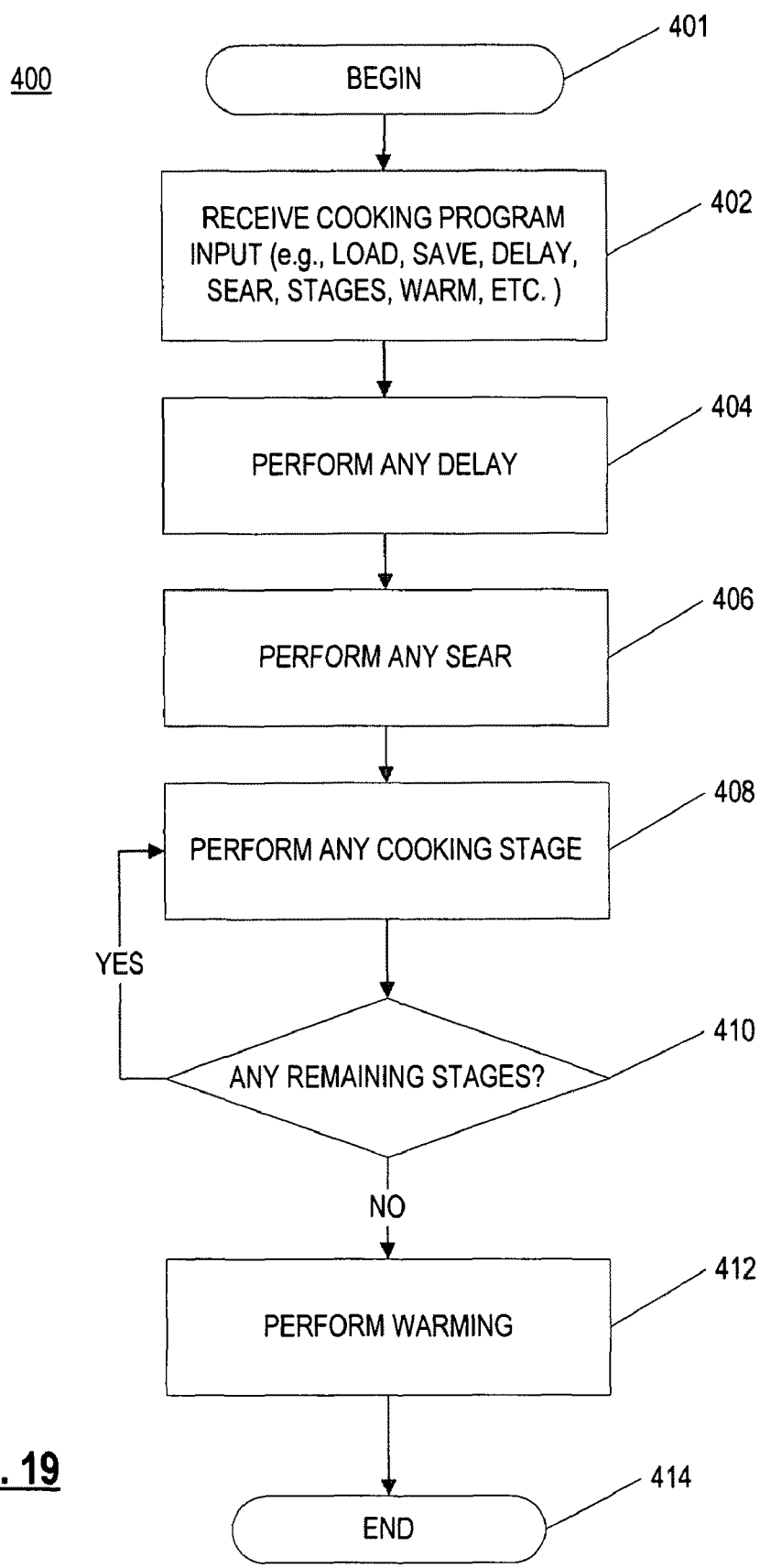
FIG. 19 depicts an exemplary flowchart of a basic overview of an exemplary embodiment of a multi-stage cooking recipe algorithm executable by an exemplary control system of an exemplary counter-top oven.

FIG. 19 is an exemplary process flowchart 400 of a basic multi-stage cooking recipe algorithm executable by an exemplary control system of an exemplary counter-top oven, according to an exemplary embodiment of the invention. According to an exemplary embodiment, the process flowchart 400 may begin at 401 and may continue with receiving cooking programming input for a multi-stage cooking recipe from the input interface, 402 (the method described in further detail in FIG. 20-22). After the Start button is depressed, any programmed delay stage may be performed, 404. During the delay stage the microwave may wait for the corresponding programmed duration before beginning cooking in the following stages. At the end of the delay stage the oven may beep to signal the end of the stage. After the delay stage, any sear stage may be performed, 406. The sear stage may heat the oven to a high temperature to sear the food initially for better browning and locking in juices. At the end of the sear stage the oven may beep to signal the end of the stage. After the sear stage any user-defined cooking stages may be performed, 408. In an exemplary embodiment, there may be multiple user-defined cooking stages, e.g., but not limited to, three, four, five, six, etc., cooking stages. In an exemplary embodiment, the initial user-defined cooking stage may be performed by heating the oven according to a specified power level for a duration corresponding to factors such as, e.g., but not limited to, duration of time, desired temperature, level of doneness, etc. After the initial cooking stage, if any user-defined stages remain, each subsequent cooking stage may be sequentially performed, 410. After all cooking stages are completed, the oven may beep four times and then may perform a warm stage, if any, 412. During the warm stage, the oven may heat the food at a low temperature to keep the food warm while it is in the oven. The process flowchart 400 may then end, 414.

Figure 20:
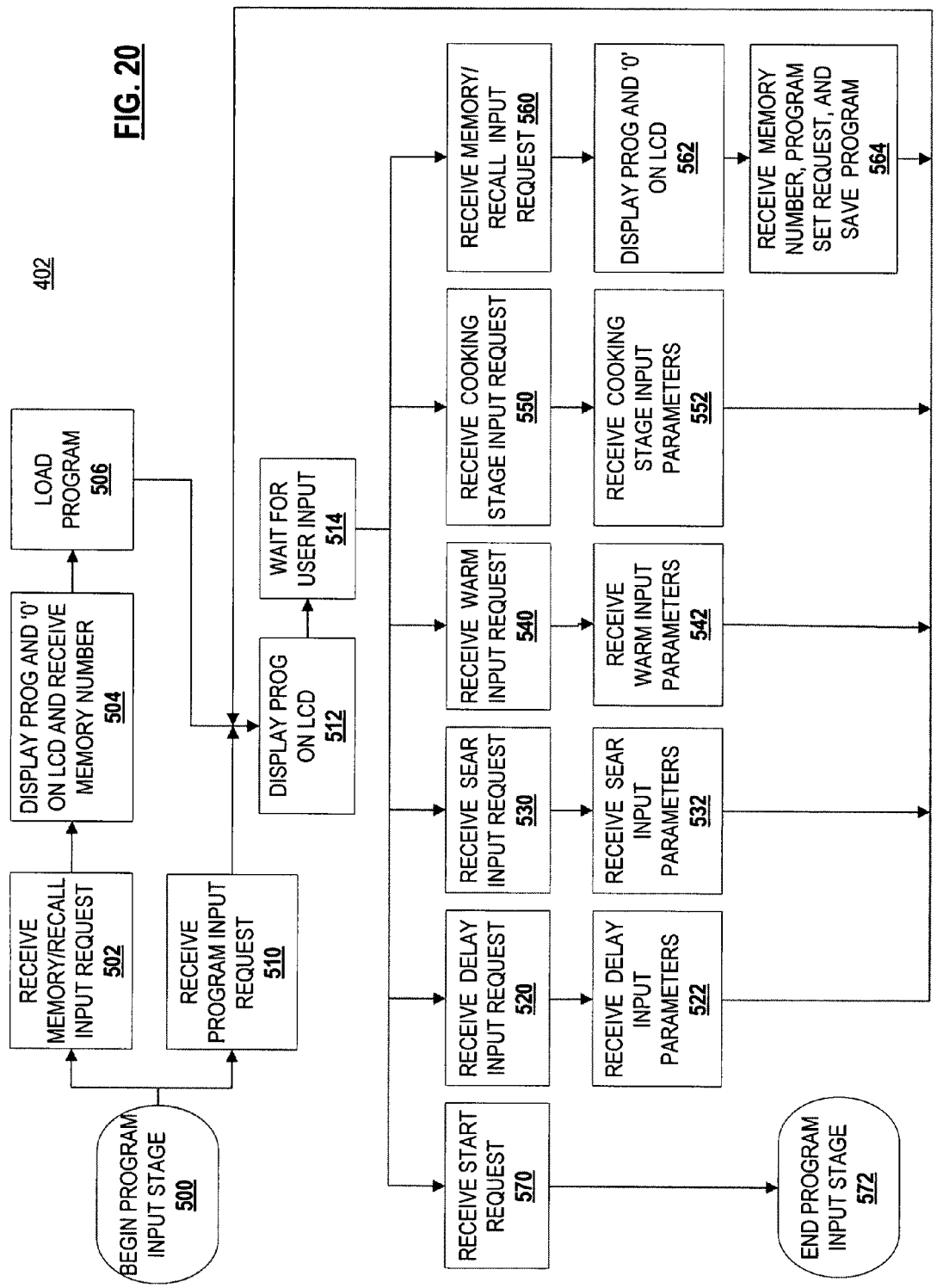
FIG. 20 depicts an exemplary flowchart of an exemplary way exemplary delay stage, sear stage and warm stage input parameters of a multi-stage cooking recipe may be received.

An exemplary process of receiving cooking program input 402 is shown in greater detail in FIG. 20, according to an exemplary embodiment of the invention. In an exemplary embodiment, the process 402 may begin at program input stage, 500. In an exemplary embodiment, the program input may occur when the control system may receive a Memory/Recall input request, 502, and/or receive a Program Input request, 510. When a Memory/Recall input request 502 is received, the control system may display "PROG" and '0' on the LCD, and may wait to receive a valid memory number, 504. Upon receiving a memory number, the control system may then load the previously programmed user-entered multi-stage cooking recipe from the corresponding memory address, 506.

According to an exemplary embodiment, after a program loads, 506, and/or a Program Input request is received, 510, the control system may display "PROG" on the LCD, 512. The control system may then wait for further user input, 514. If the system receives a Delay input request, 520, it may receive the Delay input parameters, 522 (described further in FIG. 21A). If the system receives a Sear input request, 530, it may receive the Sear input parameters, 532 (described further in FIG. 21B). If the system receives a Warm input request, 540, it may receive the Warm input parameters, 542 (described further in FIG. 18C). If the system receives a Cooking Stage input request, 550, it may receive the Cooking Stage input parameters, 552 (described further in FIG. 22). If the system receives a Memory/Recall input request, 560, it may display "PROG" and '0' on the LCD, 562. After the control system receives the memory number and the program set request, it may save the current cooking recipe to the corresponding memory address, 564. In the case where the corresponding memory address already has a previously saved cooking recipe, the previously programmed recipe may be overwritten with the current recipe. After receiving the input in each of the above cases, the control system may then return to display "PROG" on the LCD, 512, and may wait for further user input, 514. When the control system receives a Start request, 570, program input may end, 572, and the control system may begin execution of the recipe as shown in FIG. 16. In an, exemplary embodiment additional programming such as, e.g., but not limited to, editing, adding and/or deleting stages may occur even during execution of the recipe.

Figure 21A:
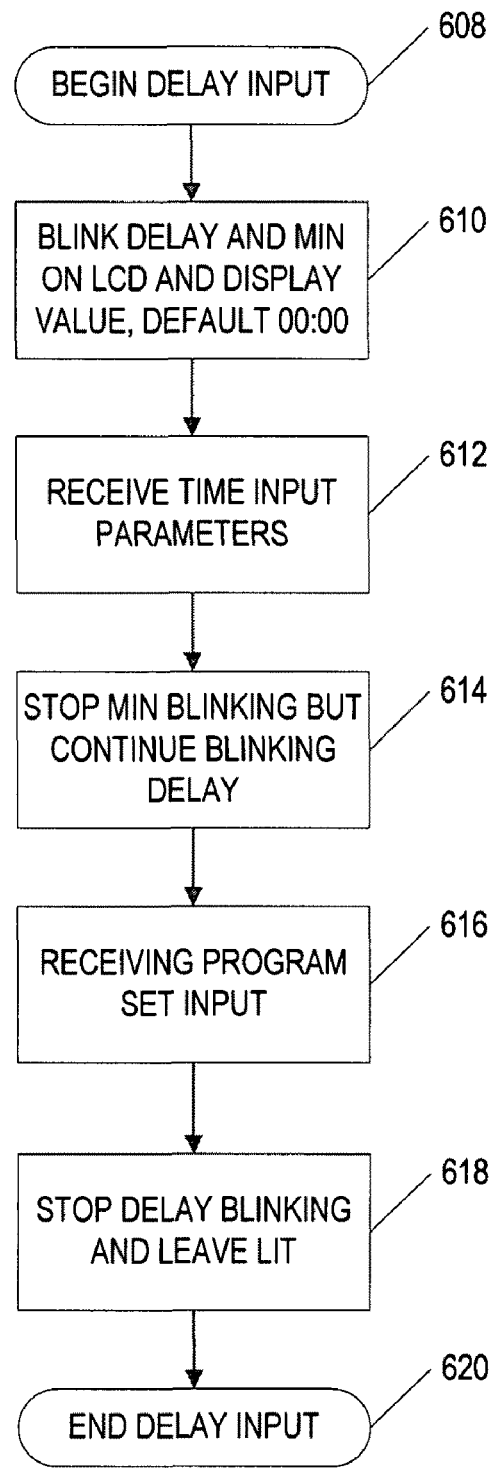
FIG. 21A-C depict exemplary flowcharts of exemplary ways exemplary stage input parameters of a multi-stage cooking recipe may be received.

Referring now to FIG. 21A, an exemplary process flow 522 of how Delay input parameters may be received is described in further detail. In an exemplary embodiment, as shown in FIG. 20, when an input request is received, 520, Delay input parameters may be received, 522. In an exemplary embodiment, the process flow 522 may start at 608 and may continue, in response to the input request, to blink DELAY and MIN on the LCD and/or display the current time duration value of the delay, 610. If there is no current value, the default value may be 00:00. Upon the control system receiving the time input parameters from user input, 612, MIN may stop blinking, but DELAY may continue to blink, 614. After receiving the Program Set input, 616, DELAY may stop blinking and/or may remain on, 618. From 618, the process flow 522 may then end, 620.

Figure 21B:
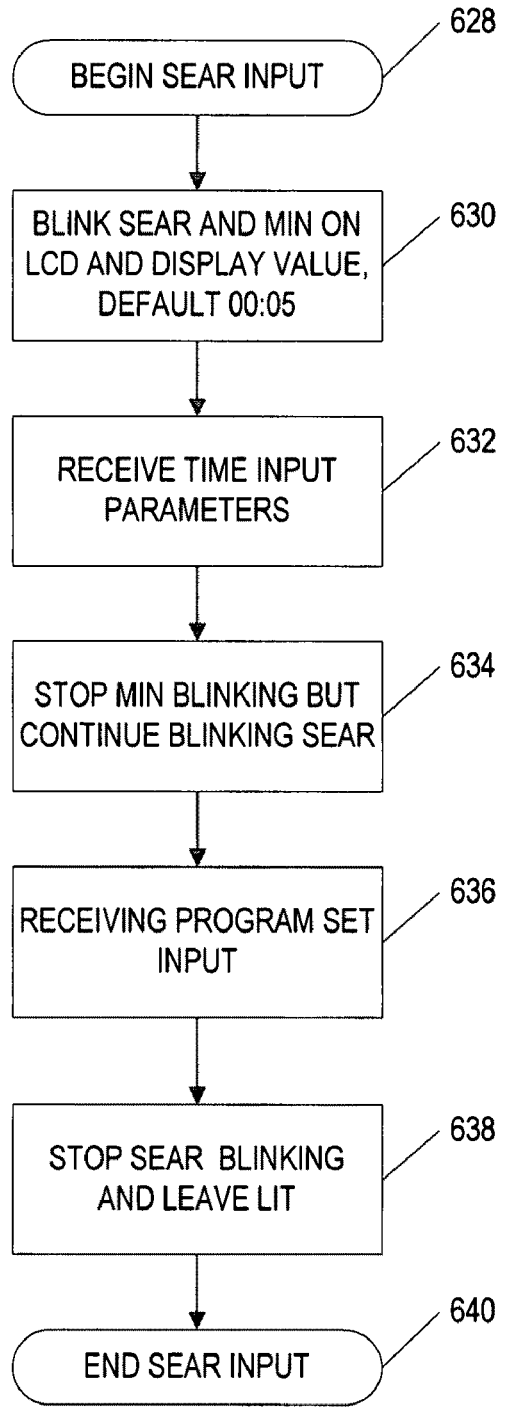

FIG. 21B describes an exemplary process flow 532 of how Sear input parameters may be received, according to an exemplary embodiment of the invention. In an exemplary embodiment, as shown in FIG. 20, when a Sear input request is received, 530, Sear input parameters may be received, 532. In an exemplary embodiment, the process flow 532 may start at 628 and may continue, in response to the input request, to blink SEAR and MIN on the LCD and/or display the current time duration value of the sear, 630. If there is no current value, the default value may be 00:05. Upon the control system receiving the time input parameters from user input, 632, MIN may stop blinking, but SEAR may continue to blink, 634. After receiving the Program Set input, 636, SEAR may stop blinking and may remain on, 638. From 638, the process flow 532 may then end, 640.

Figure 21C:
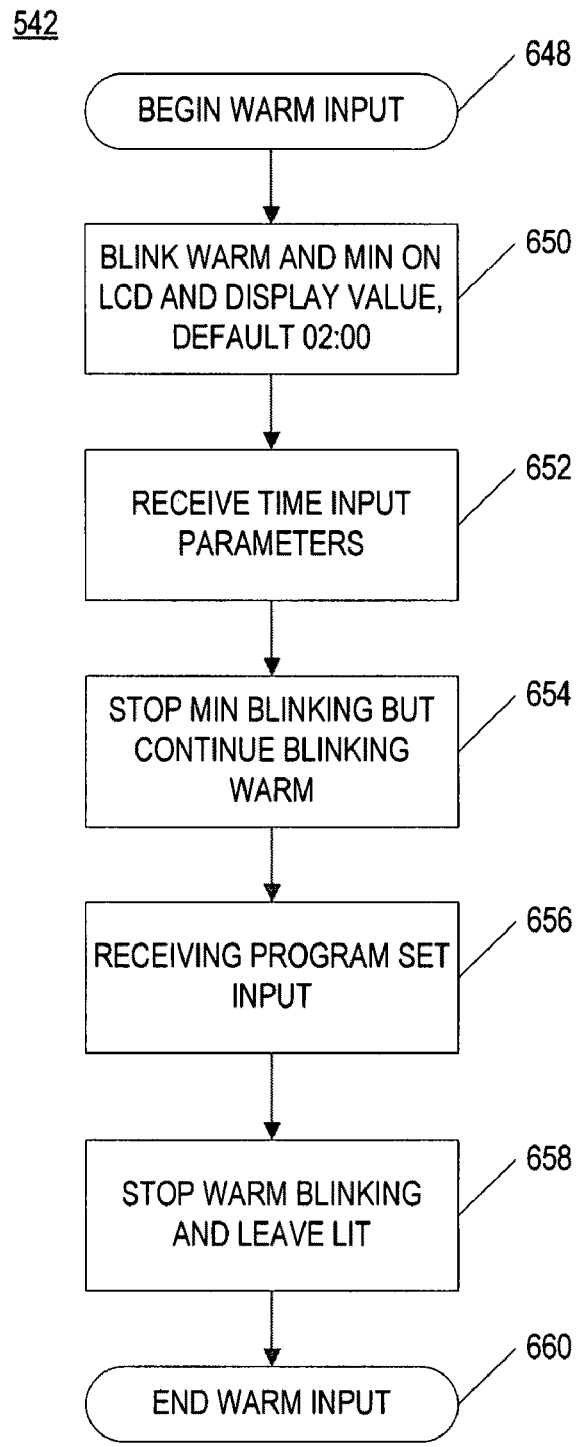

FIG. 21C describes an exemplary process flow 542 of how Warm input parameters may be received, according to an exemplary embodiment of the invention. In an exemplary embodiment, as shown in FIG. 20, when a Warm input request is received, 540, Warm input parameters may be received, 542. In an exemplary embodiment, the process flow 542 may start at 648 and may continue, in response to the input request, to blink WARM and MIN on the LCD and/or display the current time duration value of the warm, 650. If there is no current value, the default value may be 02:00. Upon the control system receiving the time input parameters from user input, 652, MIN may stop blinking, but WARM may continue to blink, 654. After receiving the Program Set input, 656, WARM may stop blinking and may remain on, 658. From 658, the process flow 542 may then end, 660.

Figure 22:
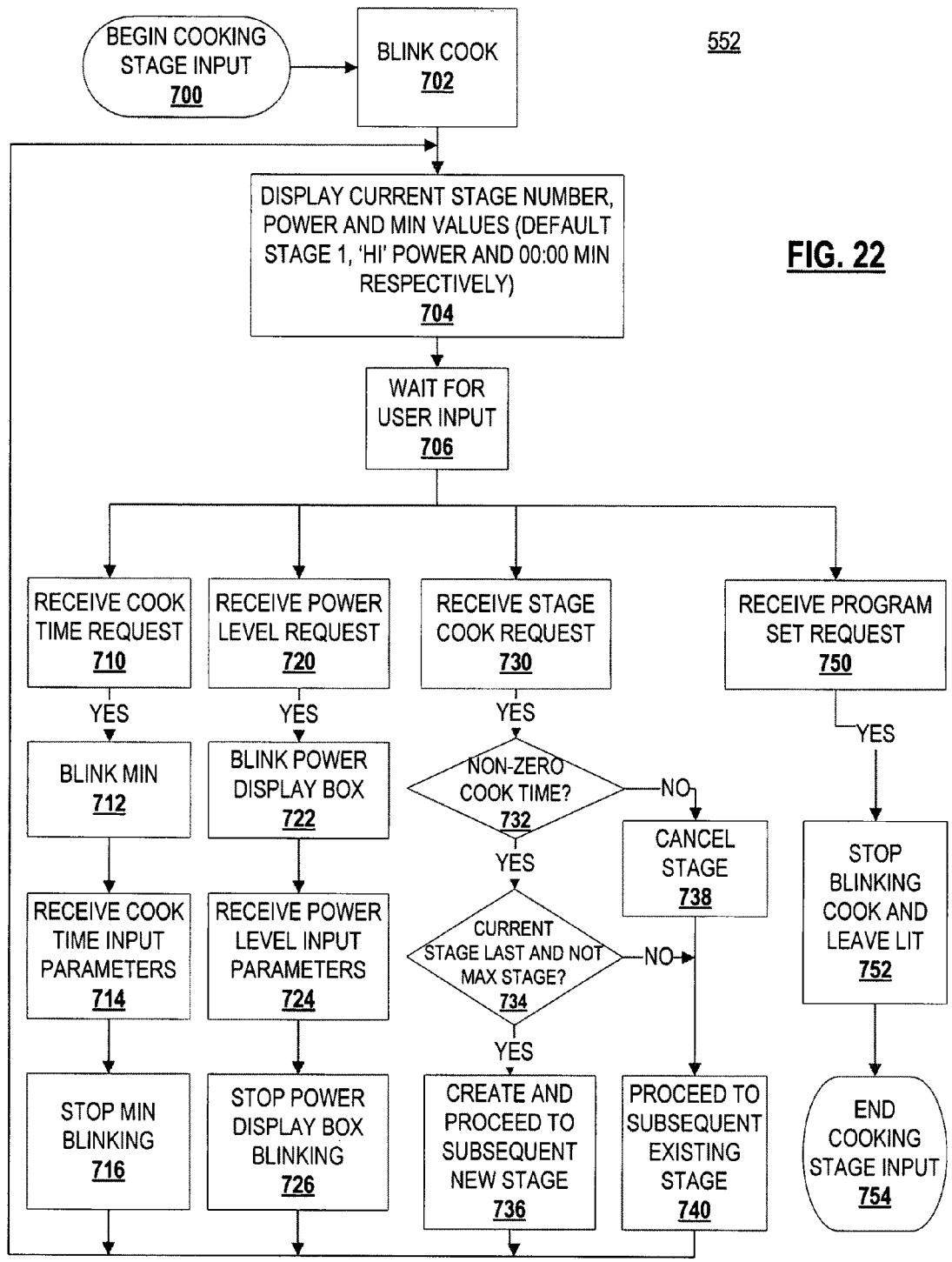
FIG. 22 depicts an exemplary flowchart of an exemplary way exemplary cooking stage input parameters of a multi-stage cooking recipe may be received.

Referring to FIG. 22, an exemplary process flow 552 of receiving Cooking stages after receipt of a Cooking State input request is described in further detail, according to an exemplary embodiment of the invention. In an exemplary embodiment, as shown in FIG. 20, cooking stages may be received 552 after a Cooking Stage input request has been received, 550. In an exemplary embodiment, the process flow 552 of cooking stages may begin at 700 and may continue with blinking COOK on the LCD, 702. The control system may then display the current stage number, power level for the stage and time duration of the stage, 704. If there are no current values for any of the above elements, the default values of Stage '1', "HI" power, and "00:00" min may be used, respectively. The control system may then wait for further user input. The system may then wait for a Cook Time input request, 710, a Power Level input request, 720, a Stage Cook input request, 730, and/or a Program Set input, 750.

If a Cook Time input request is received, 710, the system may blink MIN, 712. Upon receiving the Cook Time input parameters from user input for the Cooking Stage, 714, MIN may stop blinking, 716.

If a Power Level input request is received, 720, the system may blink the Power Level display box, 722. Upon receiving the Power Level input parameters from user input for the Cooking Stage, 724, the Power Level display box may stop blinking, 726.

If a Stage Cook input request is received, 730, the system may check whether the current stage has a non-zero Cook Time duration value, 732. If the duration value is non-zero, then the system may check whether the current stage is the last defined stage and that the maximum number of stages has not been reached, 734. If the current stage is the last defined stage and is not the maximum stage allowed, the system may create a new subsequent stage and proceed to that stage, 736, displaying and assigning values as previously described for, 704. If the current stage is not the last defined stage and/or the current stage is the maximum stage allowed, the system may proceed to the subsequent existing stage, 740. In the case where the current stage is not the last defined stage, the subsequent existing stage may be the next numerical stage. In the case where the current stage is the maximum stage allowed, the subsequent existing stage may be the first stage, Stage 1. If the current stage cooktime is not non-zero, the current stage may be cancelled, 738, which may require the system to automatically renumber any subsequent stages, and the system may proceed to the subsequent existing stage. In the case where the current cancelled stage was the last stage, the subsequent existing stage may be the first stage, otherwise, the subsequent existing stage may be the following stage. If the program set request is received, 750, the system may stop blinking COOK and leave COOK lit, 752 and may end receiving cooking stage input. The process 552 may then end at 754.

In an exemplary embodiment, the oven may accept commands for actions such as, e.g., but not limited to, pause, start, clear, display sensor data, and/or reheat, etc. An exemplary pause command may suspend execution of the recipe. An exemplary start command may unpause execution. An exemplary clear command may clear current programming information being entered. An exemplary display sensor data command may display on the interface, sensor information, such as, e.g., but not limited to, temperature and/or level of doneness, etc. An exemplary reheat command may set the power level to "HI" for 4 minutes. According to an exemplary embodiment, commands may be received and executed during the multi-stage cooking recipe programming and/or during execution of a multi-stage cooking recipe.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A multi-stage cooking method for a counter-top electric oven, the counter-top electric oven comprising at least one cooking element and at least one control system coupled to the at least one cooking element, the at least one control system comprising at least one processor, at least one storage device, and at least one input interface, said at least one processor, said at least one storage device, and said at least one input interface, coupled to one another, the method comprising:

receiving, by the at least one processor, from said at least one input interface at least one multi-stage cooking recipe for the counter-top electric oven wherein the at least one multi-stage cooking recipe comprises at least one user-selectable, and user-configurable, high temperature sear stage, the at least one user-selectable, and the user-configurable, high temperature sear stage operable, by the at least one processor, to initially at least one of brown, or sear, for up to a maximum default pre-defined time period, after an initial at least one delay stage;

storing, by the at least one processor, the at least one multi-stage cooking recipe, including the at least one user-selectable, and the user-configurable, high temperature sear stage, in the at least one storage device of the counter-top electric oven; and executing, by the at least one processor, the at least one multi-stage cooking recipe, including the at least one user-selectable, and the user-configurable, high temperature sear stage, with the counter-top electric oven.

2. The method in accordance with claim 1, wherein said receiving the at least one multi-stage cooking recipe comprises receiving at least one of at least one cooking mode, at least one power level, or at least one duration of mode.

3. The method in accordance with claim 2, wherein said cooking mode comprises at least one of:

at least one delay stage, at least one other sear stage, at least one cooking stage or at least one warming stage.

4. The method in accordance with claim 1, wherein said receiving the at least one multi-stage cooking recipe comprises receiving at least one stage and at least one duration of the stage.

5. The method in accordance with claim 1, wherein the counter-top electric oven further comprises at least one temperature probe coupled to the control system and wherein said receiving the at least one multi-stage cooking recipe further comprises receiving, by the at least one processor, a duration of mode based on a temperature or doneness as measured by said temperature probe.

6. The method in accordance with claim 1, wherein said receiving the at least one multi-stage cooking recipe comprises recalling, by the at least one processor, at least one of: at least one previously programmed, at least one predefined, or at least one user-entered of the multi-stage cooking recipe from the at least one storage device.

7. The method in accordance with claim 6, wherein said recalling, by the at least one processor, said at least one previously programmed, said at least one predefined, or said at least one user-entered of the multi-stage cooking recipe further comprises editing, by said at least one processor said previously programmed, said at least one predefined, or said at least one user-entered multi-stage cooking recipe.

8. The method in accordance with claim 1, wherein said receiving the at least one multi-stage cooking recipe comprises receiving, by said at least one processor, user entered stages from said at least one input interface, wherein said at least one input interface comprises at least one numeric keypad input interface.

9. The method in accordance with claim 8, wherein said at least one numeric keypad input interface is coupled to at least one cooking control element; and wherein said receiving by the at least one processor, the user entered stages comprises receiving the at least one multi-stage cooking recipe by the at least one processor, from the at least one cooking control elements.

10. The method in accordance with claim 1, wherein the counter-top electric oven further comprises at least one display coupled to the at least one control system, and said receiving, by the at least one processor, the at least one multi-stage cooking recipe further comprises displaying data, by the at least one processor, regarding the at least one multi-stage cooking recipe on said at least one display.

11. The method in accordance with claim 1, wherein said storing, by the at least one processor, of the multi-stage cooking recipe in the at least one storage device comprises storing, by the at least one processor, the at least one multi-stage cooking recipe in at least one of at least one volatile storage device or at least one non-volatile storage device.

12. The method in accordance with claim 1, wherein said executing the at least one multi-stage cooking recipe comprises sequentially executing, by the at least one processor, stages of a stored of the at least one multi-stage cooking recipe.

13. The method in accordance with claim 1, wherein said executing the at least one multi-stage cooking recipe comprises cooking, by the at least one processor, with the at least one cooking element wherein the at least one cooking element comprises at least one heating element.

14. The method in accordance with claim 13, wherein said at least one cooking element comprises at least one infrared heating element including a ceramic coating; and wherein said executing, by the at least one processor, the at least one multi-stage cooking recipe further comprises cooking with said at least one infrared heating element.

15. The method in accordance with claim 1, wherein said executing the at least one multi-stage cooking recipe comprises cooking with the at least one cooking element comprising a plurality of heating elements and cooking with said plurality of heating elements comprises cooking at an individually selectable power level for each heating element.

16. The method in accordance with claim 1, wherein the counter-top electric oven further comprises at least one temperature probe coupled to said control system, and said executing the at least one multi-stage cooking recipe further comprises altering, by said at least one processor, said execution based on data from said at least one temperature probe.

17. The method in accordance with claim 1, wherein the counter-top electric oven further comprises a display coupled to the control system, and said executing the at least one multi-stage cooking recipe further comprises displaying information, by said at least one processor, regarding progress of said executing of the at least one multi-stage cooking recipe on said display.

18. The multi-stage cooking method in accordance with claim 1, wherein the at least one user-selectable, and the user-configurable, high temperature sear stage operable, by the at least one processor, to initially at least one of brown, or sear, for up to the maximum default pre-defined time period, after the initial at least one delay stage, wherein the maximum default pre-defined time period is 5 seconds.

19. A multi-stage cooking counter-top electric oven comprising:
at least one cooking element;
at least one control system coupled to said at least one cooking element, said at least one control system comprising:
at least one processor operable to execute at least one multi-stage cooking recipe with the counter-top electric oven;
at least one input interface, coupled to said at least one processor, said at least one processor operable to receive the at least one multi-stage cooking recipe for the counter-top electric oven wherein said at least one multi-stage cooking recipe comprises at least one user-selectable, and user-configurable, high temperature sear stage, the at least one user-selectable, and the user-configurable, high temperature sear stage operable, by the at least one processor, to initially at least one of brown, or sear, for up to a maximum default pre-defined time period, after an initial at least one delay stage; and
at least one storage device, coupled to said at least one processor, said at least one processor operable to store the at least one multi-stage cooking recipe in the at least one storage device of the counter-top electric oven.

20. The multi-stage cooking counter-top electric oven in accordance with claim 19, wherein said at least one heating element is arranged to avoid being dripped upon by the object being cooked.

21. The multi-stage cooking counter-top electric oven in accordance with claim 19, wherein said at least one heating element comprises a plurality of heating elements including at least one of a top, or a bottom heating element.

22. The multi-stage cooking counter-top electric oven in accordance with claim 19, the oven further comprising a cooking enclosure comprising at least one of polycarbonate, glass, or metal.

23. The multi-stage cooking counter-top electric oven in accordance with claim 19, the oven further comprising a cooking enclosure having a least one of a door or a cover which is at least one of: slideable, removeable, or hinged.

24. The multi-stage cooking counter-top electric oven in accordance with claim 19, the oven further adapted to receive a rotisserie.

25. The multi-stage cooking counter-top electric oven in accordance with claim 19, the oven further comprising at least one of: at least one pan, at least one cooking rack, or at least one fan.

26. The multi-stage cooking counter-top electric oven in accordance with claim 19, wherein the at least one user-selectable, and the user-configurable, high temperature sear stage operable, by the at least one processor, to initially at least one of brown, or sear, for up to the maximum default pre-defined time period, after the initial at least one delay stage, wherein the maximum default pre-defined time period is 5 seconds.

27. A control system for a counter-top electric oven, comprising
at least one processor operable to execute at least one multi-stage cooking recipe with the counter-top electric oven;
at least one input interface, coupled to said at least one processor, said at least one processor operable to receive the at least one multi-stage cooking recipe for the counter-top electric oven from said at least one input interface, wherein said at least one multi-stage cooking recipe comprises at least one user-selectable, and user-configurable, high temperature sear stage, the at least one user-selectable, and the user-configurable, high temperature sear stage operable, by the at least one processor, to initially at least one of brown, or sear, for up to a maximum default pre-defined time period, after an initial at least one delay stage; and at least one storage device, coupled to said at least one processor, said at least one processor operable to store the at least one multi-stage cooking recipe including said at least one sear stage in said at least one storage device of the counter-top electric oven.

28. The control system for the counter-top electric oven in accordance with claim 27, wherein the at least one user-selectable, and the user-configurable, high temperature sear stage operable, by the at least one processor, to initially at least one of brown, or sear, for up to the maximum default pre-defined time period, after the initial at least one delay stage, wherein the maximum default pre-defined time period is 5 seconds.

* * * * *